Figure 1:
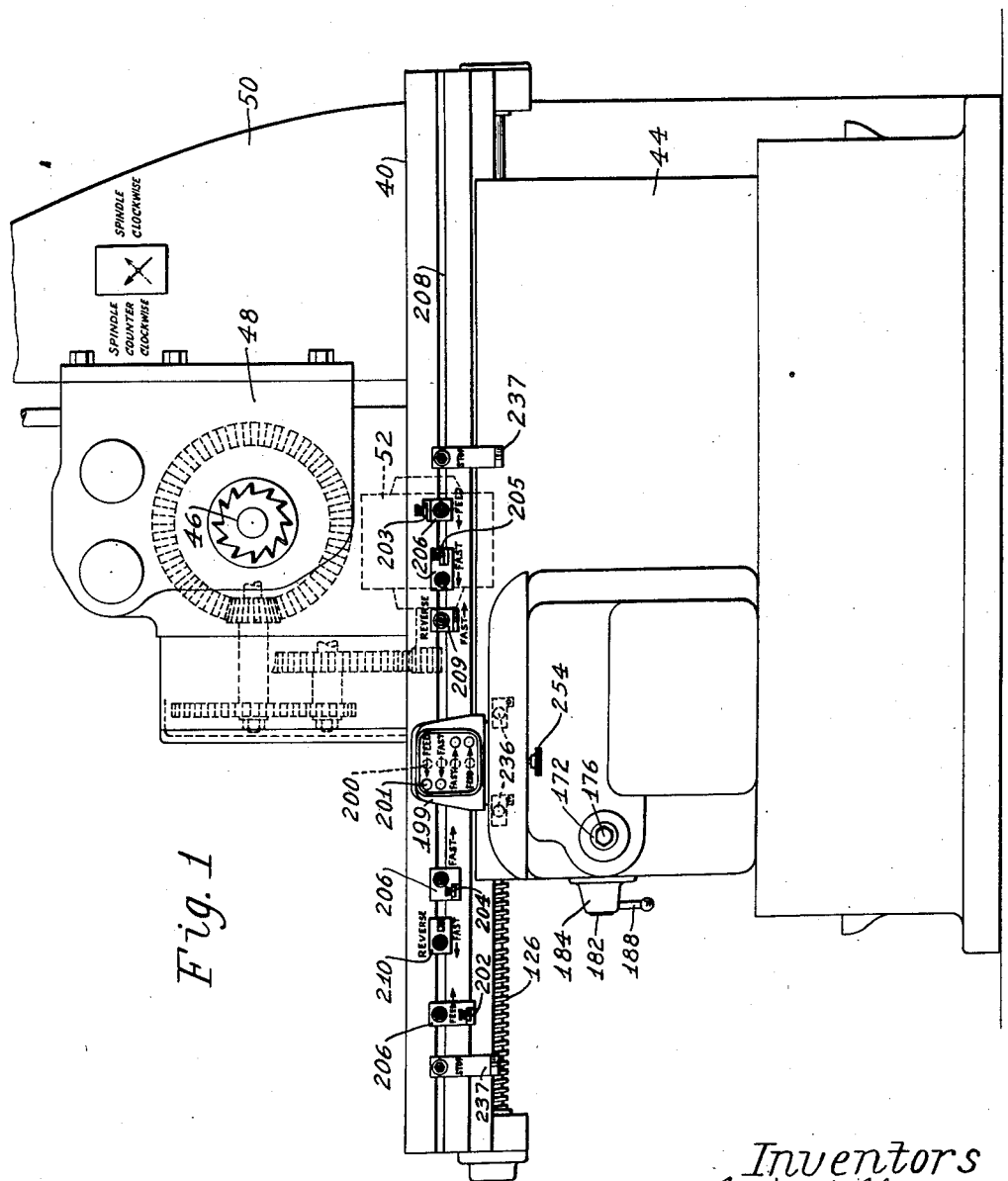

April 20, 1937.  B. P. GRAVES ET AL  2,077,408
MACHINE TOOL
Filed March 9, 1934    12 Sheets-Sheet 1

Witness
Chas. T. Olson

Inventors
Benjamin P. Graves
Alden G. Bennett
by Crish Hildreth
Cary & Jenney Attys.

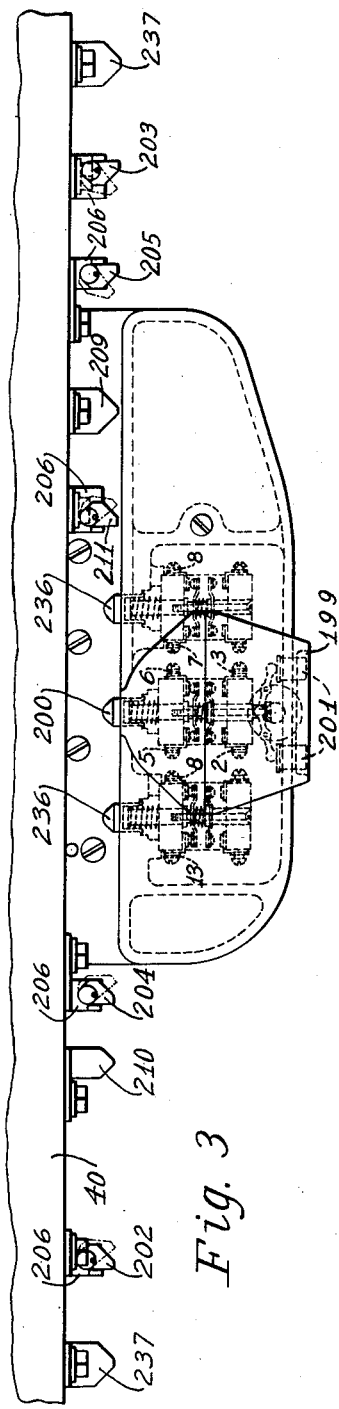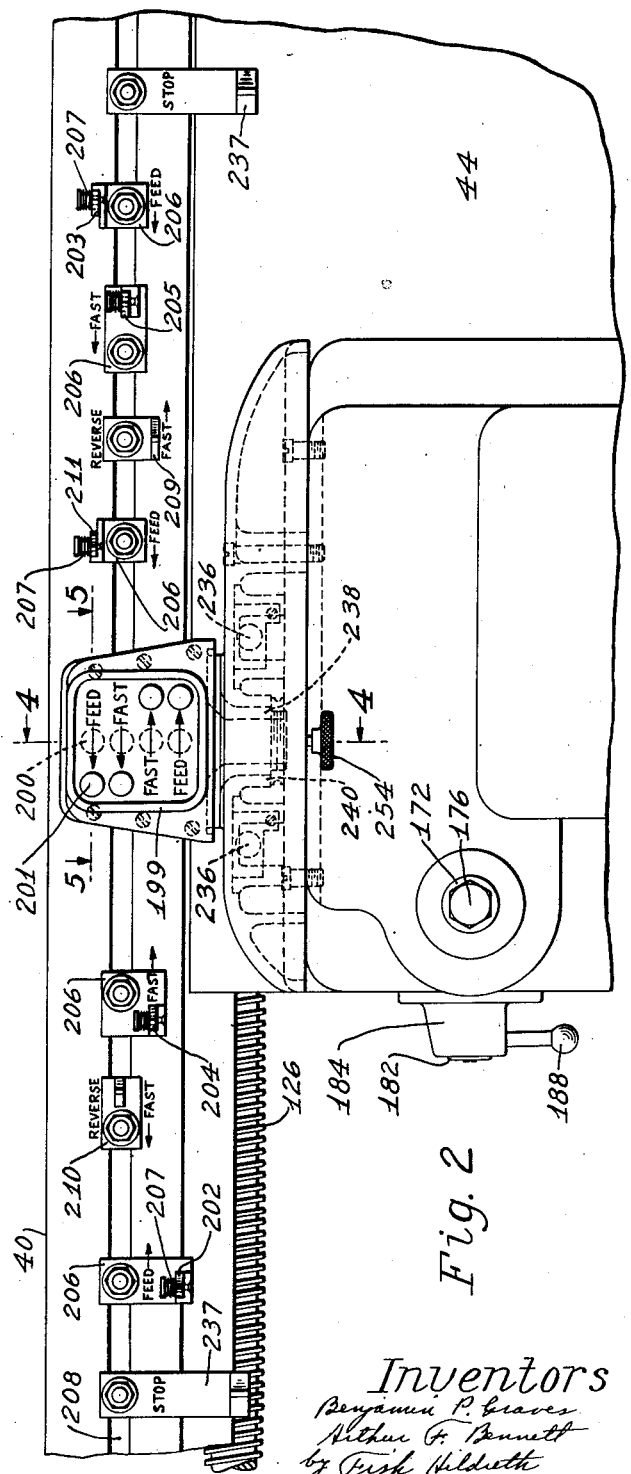

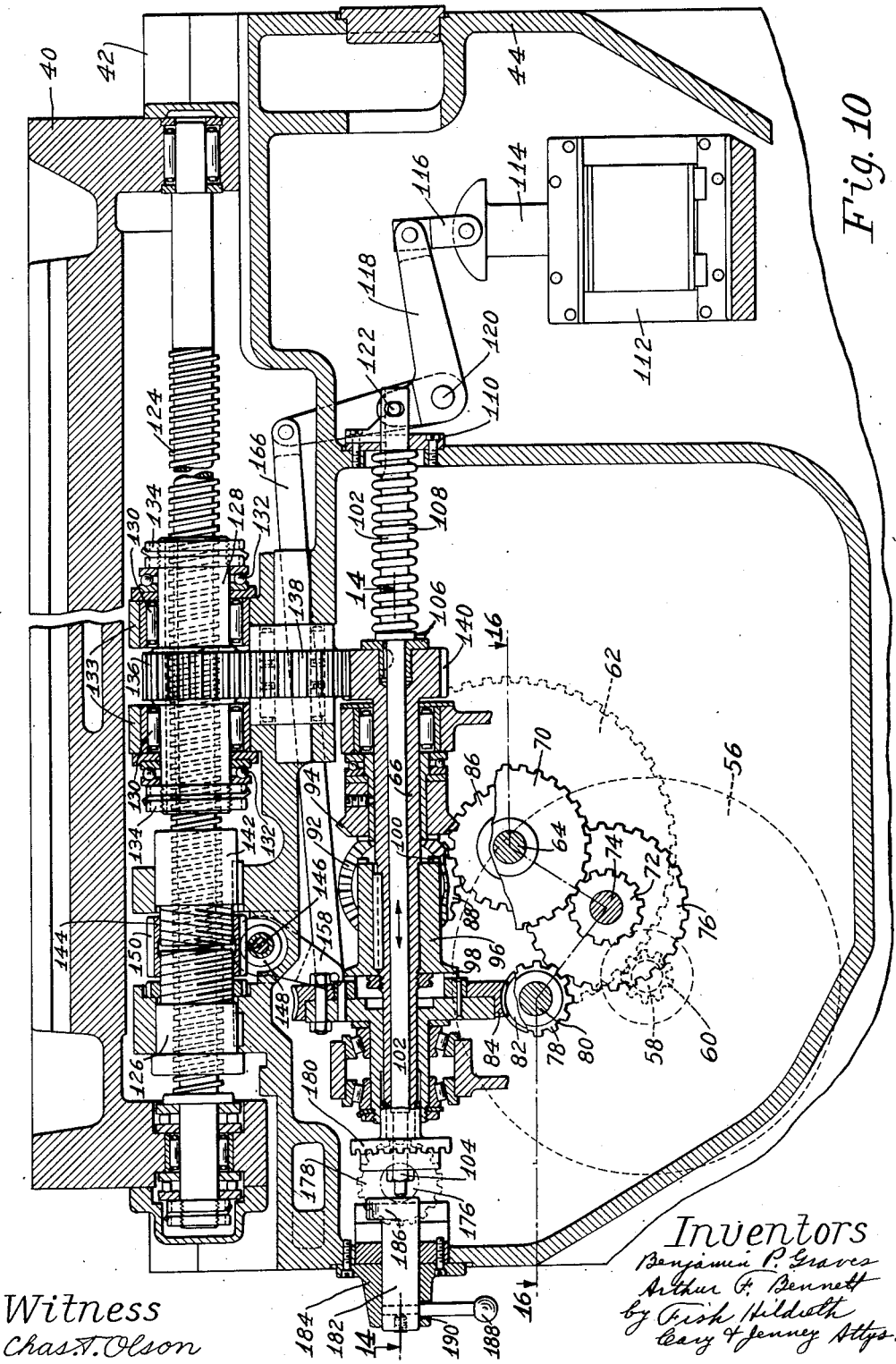

April 20, 1937.   B. P. GRAVES ET AL   2,077,408
MACHINE TOOL
Filed March 9, 1934   12 Sheets-Sheet 6
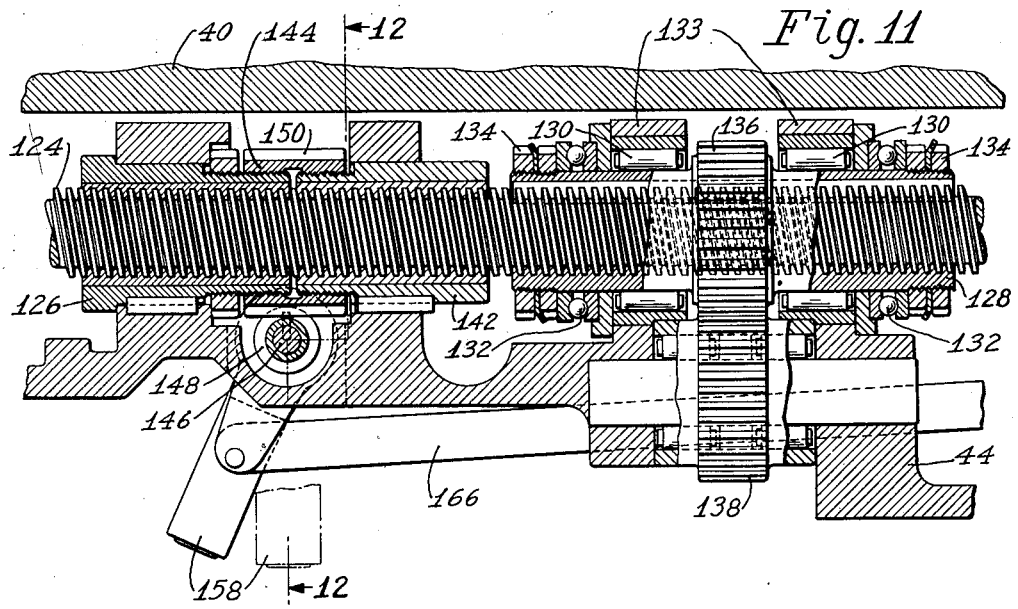
Fig. 11
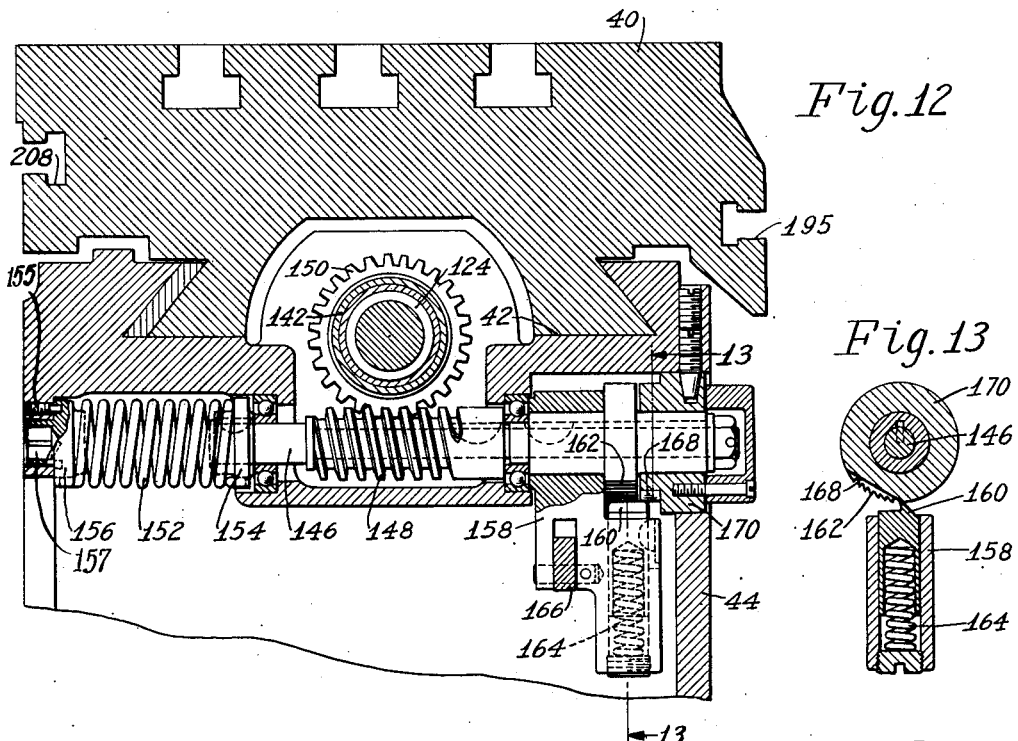
Fig. 12
Fig. 13
Witness
Chas. T. Olson
Inventors
Benjamin P. Graves
Arthur F. Bennett
by Fish Hildreth
Cary & Jenney Attys.

April 20, 1937.  B. P. GRAVES ET AL  2,077,408

MACHINE TOOL

Filed March 9, 1934  12 Sheets-Sheet 7

Witness
Chas. T. Olson

Inventors
Benjamin P. Graves
Arthur F. Bennett
by Fish Hildreth
Cary & Jenney Attys

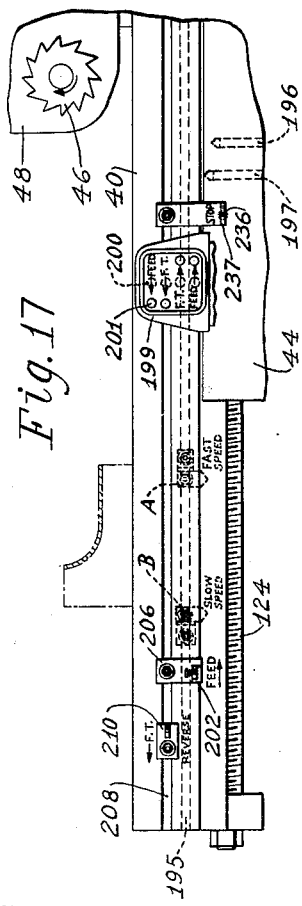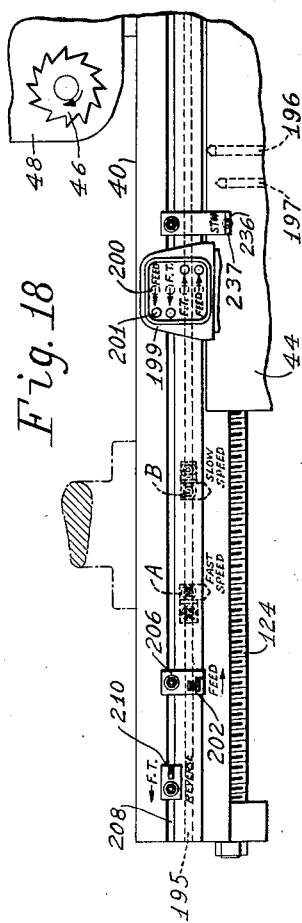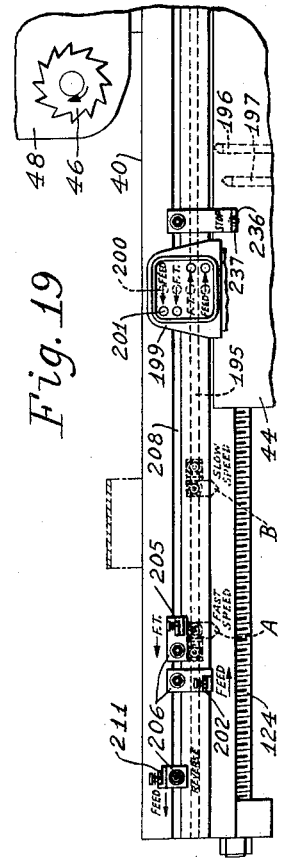

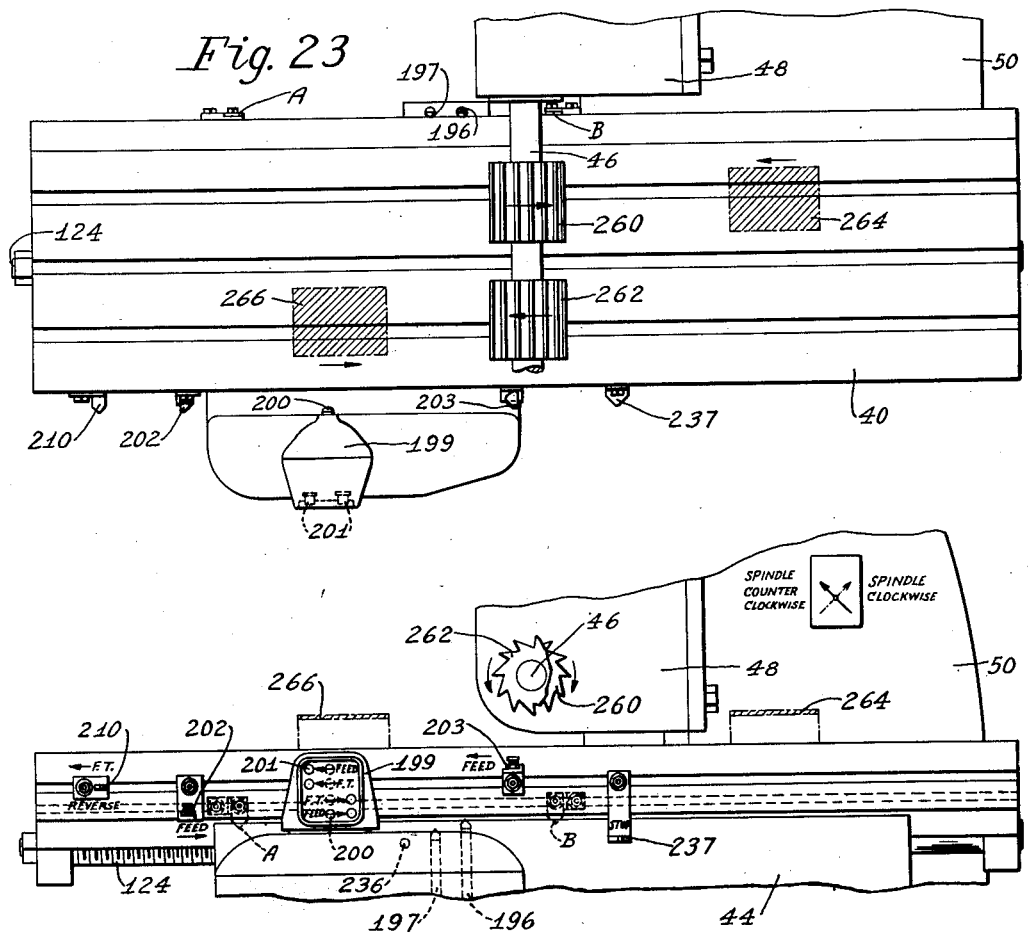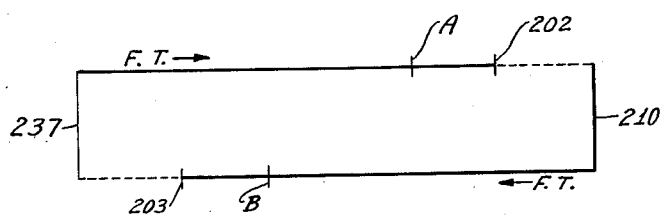

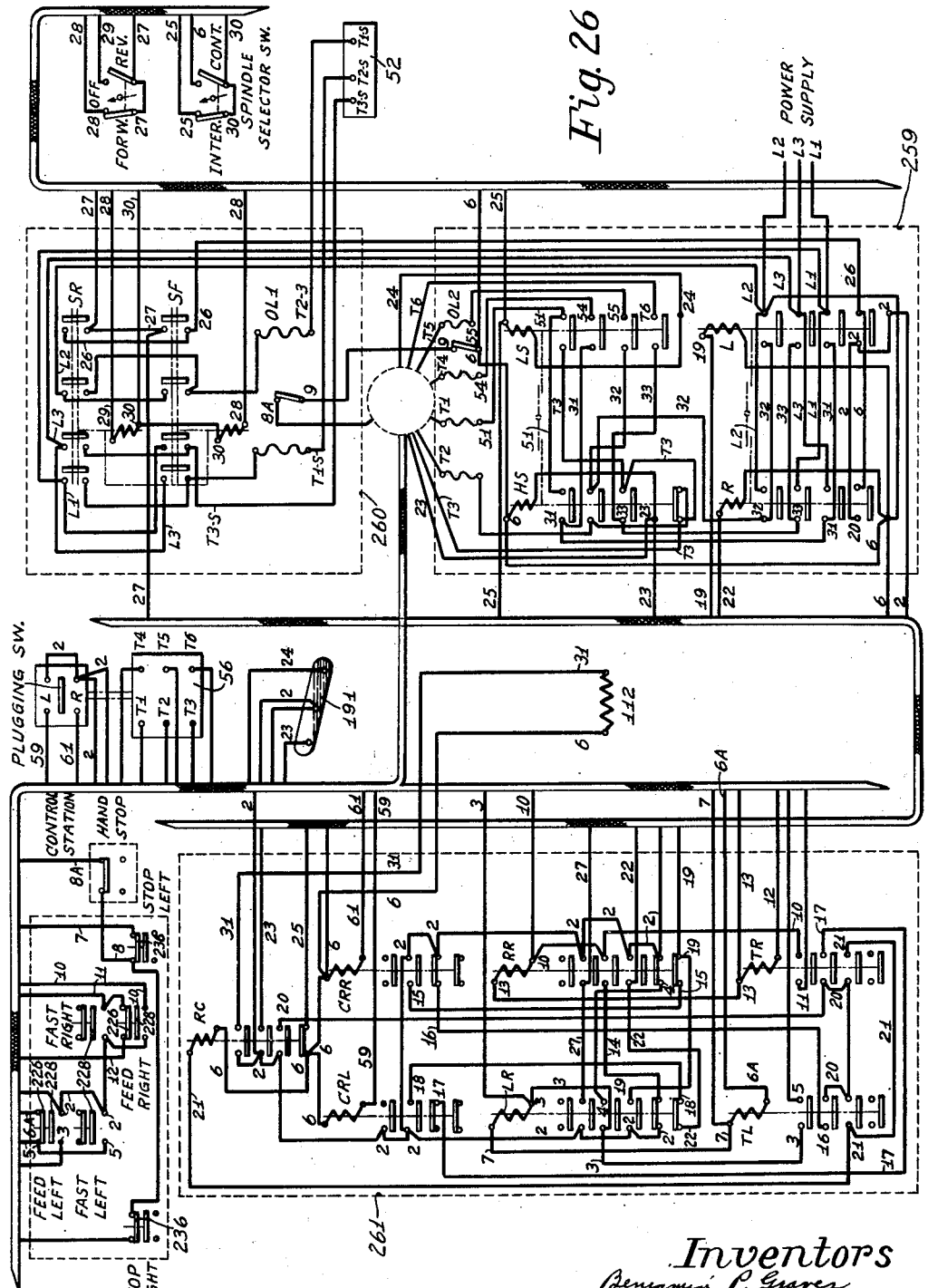

April 20, 1937.   B. P. GRAVES ET AL   2,077,408
MACHINE TOOL
Filed March 9, 1934    12 Sheets-Sheet 12

Witness
Chas. T. Olson

Inventors
Benjamin P. Graves
Arthur G. Bennett
by Fish Richett
Cary & Jenney Attys Patented Apr. 20, 1937

2,077,408

UNITED STATES PATENT OFFICE 2,077,408

MACHINE TOOL

Benjamin P. Graves, Cranston, and Arthur F. Bennett, West Barrington, R. I., assignors, by mesne assignments, to Brown and Sharpe Manufacturing Company, Providence, R. I., a corporation of Rhode Island Application March 9, 1934, Serial No. 714,809

50 Claims. (Cl. 90—21)

The present invention relates to improvements in machine tools, and more specifically to a class of machines which include a movable support mounted on ways to impart relative feeding and return movements to the work and operating tools.

The invention is herein disclosed as embodied in a milling machine which comprises a rotary milling cutter and a movable work support or table driven from a two-speed reversible electric motor through connections which include cooperating feed screw and nut driving elements and slow feed and quick traverse clutch connections.

It is one object of the present invention to provide in a machine of this general description, a novel and improved take-up device having a yielding take-up action to maintain a tight working engagement between the feed screw and nut elements which is particularly well adapted to insure the accurate positioning of the table at all times under varying strains during its travel in either direction without at the same time causing excessive frictional wear or binding of the parts.

It is another object of the present invention to provide novel and improved means for controlling the operation of the slow feed and quick traverse clutch connections above referred to, during the automatic operation of the machine, constructed and arranged to delay the shifting of the slow feed and quick traverse clutch connections to quick traverse position upon shifting from a slow feed of the table in one direction to a quick traverse rate of movement in the opposite direction, until after the motor and work support driven thereby have been brought to a substantial stop.

It is another object of the invention to provide means for easing off the take-up device which is arranged automatically to control the degree of tightness between the feed screw and nut elements of the table drive for different operating conditions of the machine, particularly during the manual or quick traverse operation of the table.

Other objects of the invention relate to the provision of novel and improved control means for actuating the several cooperating devices comprising particularly the drive for the movable support to secure a more efficient operation of the support for both manual and power operation.

With these and other objects in view, as may hereinafter appear, one feature of the present invention consists in the provision in the table drive of a novel and improved take-up device for maintaining a tight operating engagement between the feed screw and nut elements to insure an accurate and even movement of the table regardless of the force exerted on the table in either direction by the operation of the cutter. This device comprises a second non-rotatable nut threaded to the feed screw and a take-up nut internally threaded to corresponding left and right hand threaded portions on the feed nuts, so that rotational movement of the take-up nut will tend to move the auxiliary nut with relation to the fixed nut to secure a tight operating fit between the feed screw and nut elements. The take-up nut is connected through a worm and gear connection to a rotatable take-up member which is actuated by a torsional spring to provide a yielding take-up action at all times to maintain a tight operating fit between the feed screw and nut elements. With this construction and arrangement of the parts, an irreversible take-up action is provided, so that the strain exerted on the table in either direction by the engagement of the rotating cutter with the work, is taken up directly against the fixed nut.

In accordance with the invention there is also provided in the present construction, mechanism which is arranged upon movement of the slow feed and quick traverse clutch to neutral or quick traverse position to ease off the take-up device. With the construction and arrangement herein disclosed, the movement of the clutch to neutral position serves to partially ease off the take-up device for the manual operation of the table by the operator, while at the same time permitting an accurate adjustment of the table and work supported thereon. Upon movement of the clutch to quick traverse position, the take-up device is entirely eased off so that the strain and wear upon the driving connections for quick traverse operation is reduced to a minimum.

There is also provided with the present construction, hand feed driving connections for the table including a hand feed control member or plug which is arranged normally to hold the hand feed connections out of operation, and acts when rendered operative to move the slow feed and quick traverse clutch from slow feed to neutral position, and to permit the engagement of the hand feed. The continued movement of the clutch to quick traverse position, operates positively to disconnect the hand feed.

In accordance with certain features of the present invention, the operation of the machine is controlled by means of a number of electrically operated devices which are constructed and arranged to provide a particularly efficient and versatile control of the several cooperating mechanisms of the machine for either automatic or manual operation. In addition to the reversible two-speed electric motor above mentioned for driving the table, there is provided a reversible motor for driving the spindle, an electromagnet in the form of a solenoid which operates when energized to move the slow feed and quick traverse clutch to quick traverse position, and a number of switch connections including a plugging switch which is arranged to plug, or electrically reverse, the motor to bring it quickly to rest for either stopping or reversing the direction of table drive.

In accordance with one feature of the invention, electrical connections have been provided which are controlled through the plugging switch, and are arranged when the controls are set to secure a reversal of the direction of drive with a simultaneous shift of the clutch to quick traverse position, to delay the operation of the clutch until the motor has been brought to a stop. The mode of operation of the table driving motor and clutch in connection with the reversal at a quick traverse rate as above described, is of particular importance where the cutter is fed against a shoulder, and it is then required to retract the work away from the cutter at a quick traverse rate. Under these conditions it has been found that if the clutch is shifted to quick traverse position before the motor is completely stopped, the increased speed of the table will tend to cause the cutter to jump into the work. Furthermore, the shifting of the clutch while the table is feeding under load, subjects the clutch teeth to excessive wear.

With the construction and mode of operation of the machine herein set forth, the operation of the table and cutter spindle is controlled by means of a simple arrangement of switch control buttons which are supported on a control post adjacent the table. These buttons are arranged in two sets to permit the control of the table either manually or by the operation of dogs supported on the table. The electrical connections are so arranged that the direction and rate of movement of the table may be obtained simply by pressing a single button to secure the designated direction and rate of feed of the table.

Another feature of the invention consists in the specific arrangement of the control post to permit the movement of the post and the control buttons supported thereon out of the path of the dogs when it is desired to control the operation of the table entirely by hand.

Figure 4:
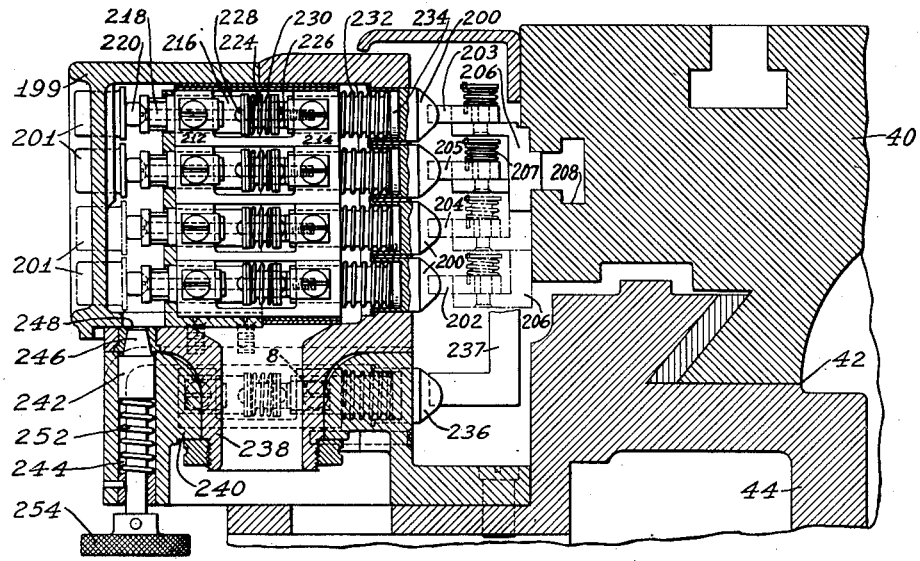
Figure 5:
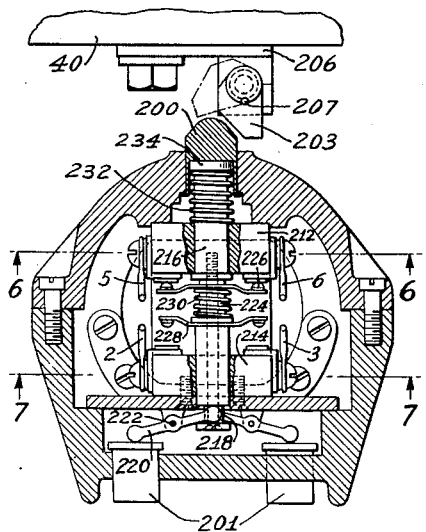
Figure 6:
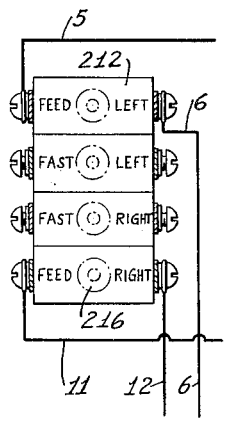
Figure 7:
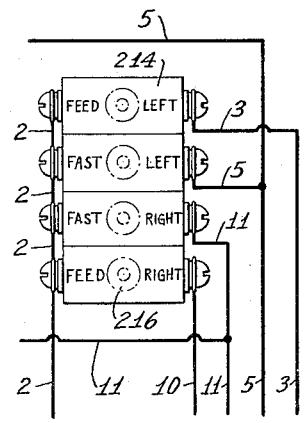
Figure 9:
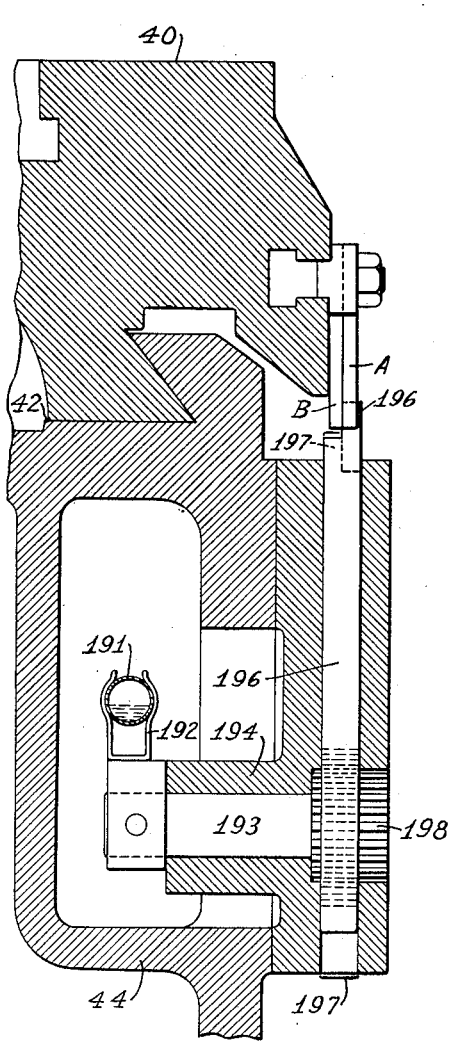
Figure 8:
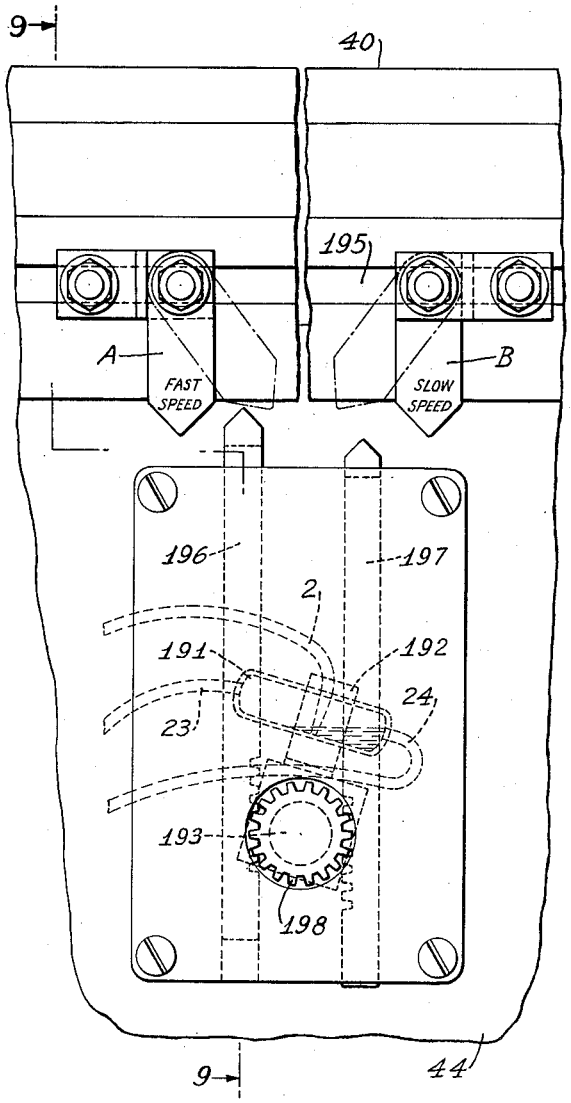
Figure 14:
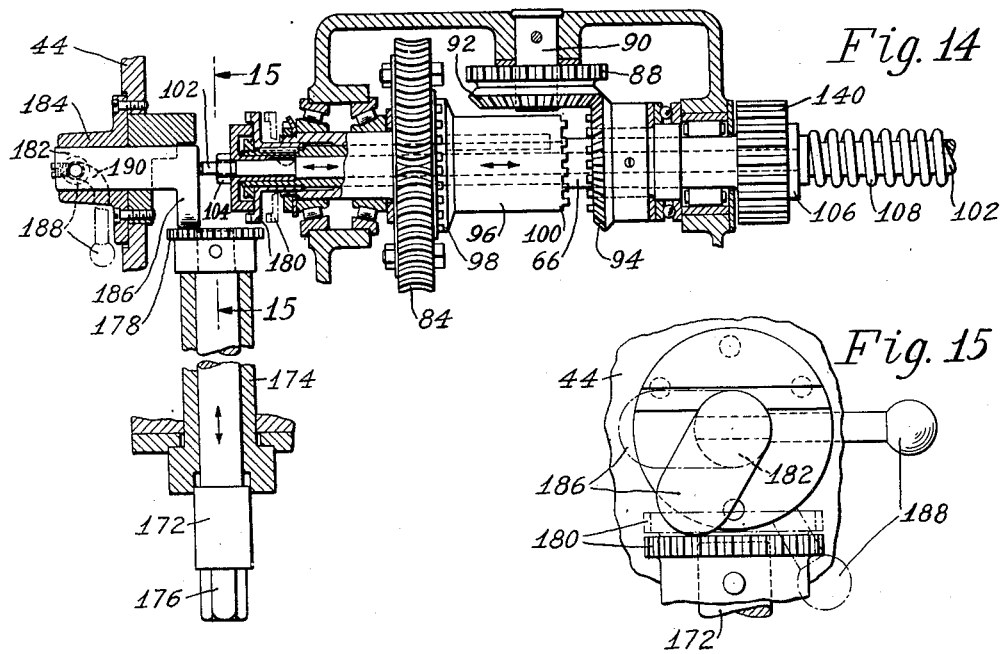
Figure 15:
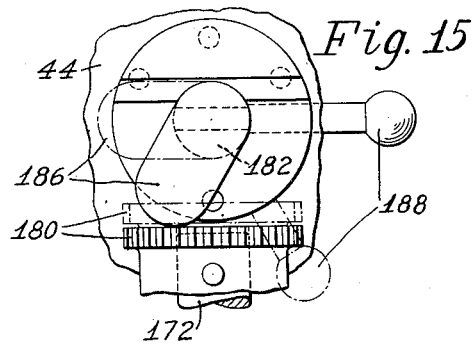
Figure 16:
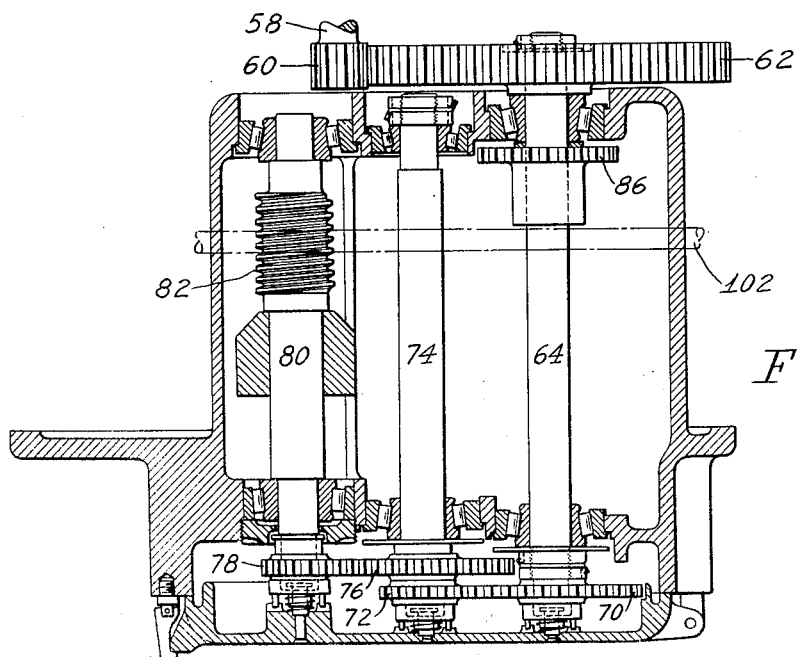
Figure 27:
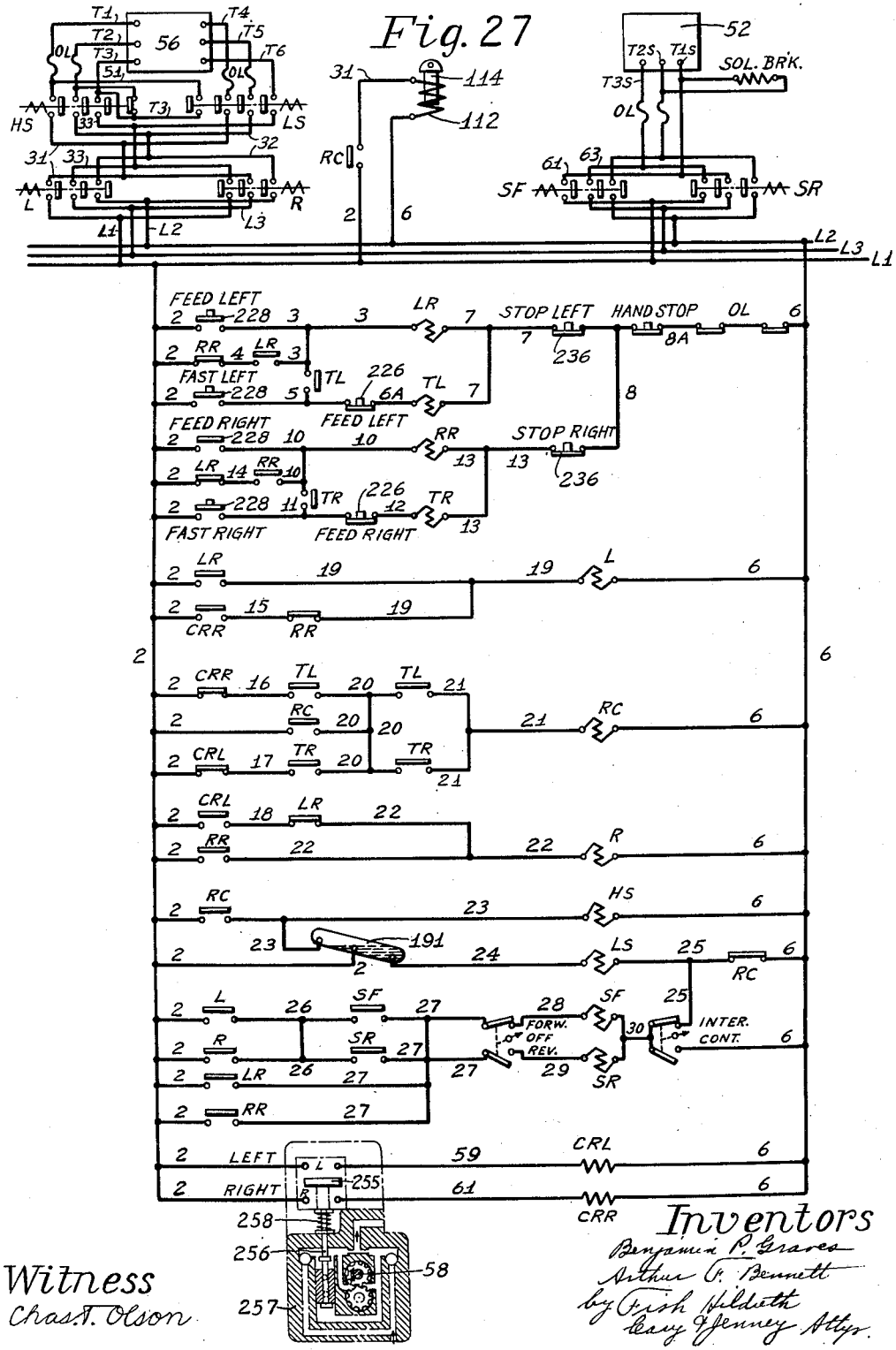
Figure 28:
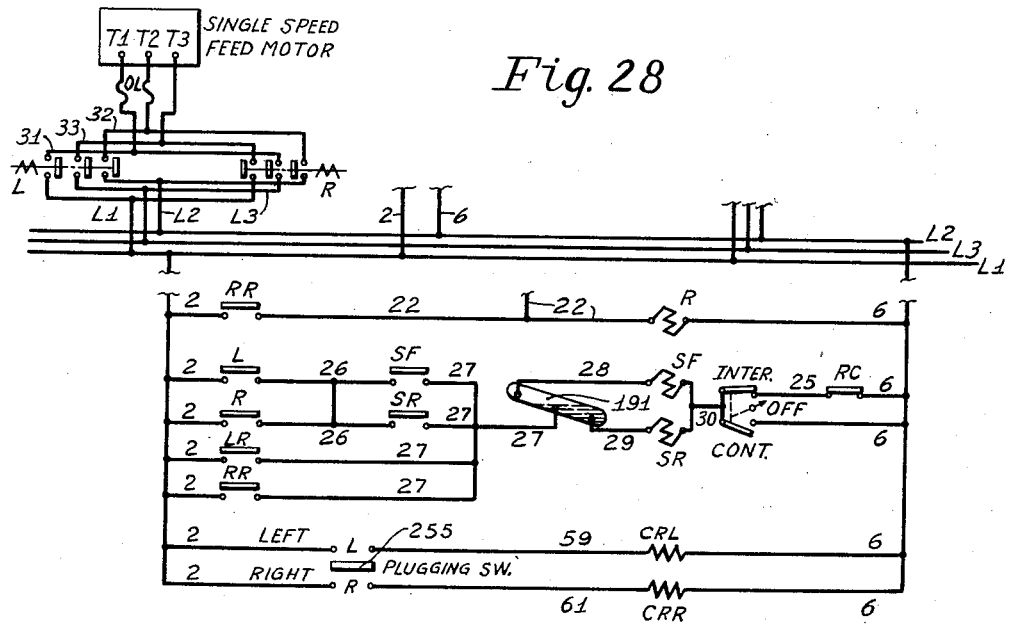
Figure 29:
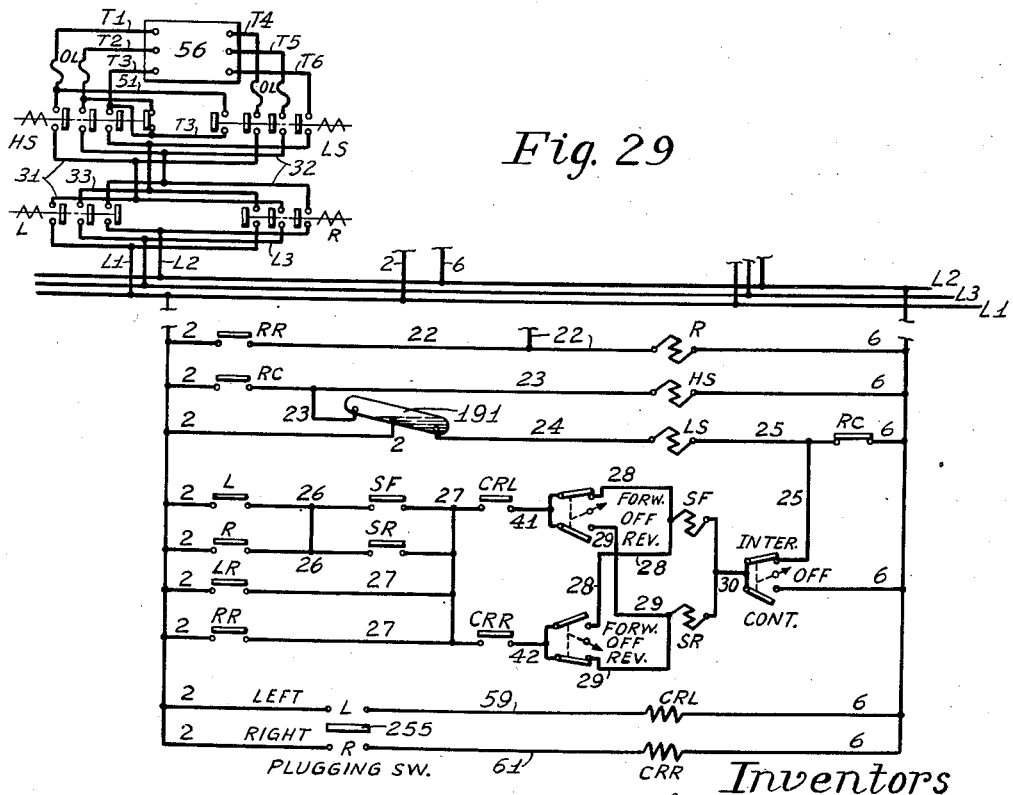

The several features of the invention consist also in the devices, combinations and arrangement of parts hereinafter described, which together with the advantages to be obtained therefrom will be readily understood by one skilled in the art from the following description taken in connection with the accompanying drawings, in which Fig. 1 is a view in front elevation of a milling machine embodying in a preferred form the several features of the present invention; Fig. 2 is an enlarged view of a portion of the machine shown in Fig. 1, to illustrate particularly the automatic controls for the work support; Fig. 3 is a plan view of substantially the parts shown in Fig. 2; Fig. 4 is a sectional view taken on the line 4—4 of Fig. 2 to illustrate particularly the control post and switches mounted therein for controlling the operation of the work support; Fig. 5 is a sectional plan view taken on the line 5—5 of Fig. 2; Fig. 6 is a somewhat diagrammatic view taken substantially on the line 6—6 of Fig. 5, to illustrate certain of the electrical switch connections in the control post; Fig. 7 is a view taken substantially on the line 7—7 of Fig. 5 illustrating particularly the cooperating electrical contacts of the switches in the control post; Fig. 8 is a detail view in rear elevation illustrating particularly the adjustable table dogs and the mercury switch controlled thereby which may be utilized as hereinafter described either to shift the motor speed from slow to fast and vice versa, or to control the direction of rotation of the cutter spindle; Fig. 9 is a sectional view taken on the line 9—9 of Fig. 8; Fig. 10 is a view in front elevation partly in section to illustrate particularly the driving connections for the table, and the control mechanism for simultaneously operating the quick traverse clutch and for easing off the take-up device; Fig. 11 is a detail sectional view of certain portions of the mechanism shown in Fig. 10 to illustrate particularly the take-up device; Fig. 12 is a sectional view taken on the line 12—12 of Fig. 11; Fig. 13 is a detail sectional view taken on the line 13—13 of Fig. 12; Fig. 14 is a detail sectional view taken on the line 14—14 of Fig. 10 to illustrate particularly the hand feed control and a portion of the driving connections to the table; Fig. 15 is a detail sectional view taken on the line 15—15 of Fig. 14; Fig. 16 is a detail sectional view taken substantially on the line 16—16 of Fig. 10, to illustrate particularly a portion of the driving mechanism for the work support; Figs. 17, 18 and 19 are somewhat diagrammatic detail views of the table, and certain of the table dogs arranged to illustrate the set-up of the machine for milling operations on three different types of work; Figs. 20, 21 and 22 are diagrams indicating the course of table movement with the set-up shown respectively in Figs. 17, 18 and 19; Figs. 23 and 24 are detail views respectively in plan and in front elevation of the table and cutter elements illustrating particularly the setting of the machine with two oppositely faced cutters for operation during the travel of the work table in each direction; Fig. 25 is a diagram showing the operation of the table as illustrated in Figs. 23 and 24 taken in connection with the diagrammatic view Fig. 27; Fig. 26 is a diagrammatic view of the electrical connections for controlling the several cooperating mechanisms of the machine; Fig. 27 is an explanatory diagrammatic view of the connections shown in Fig. 26; Fig. 28 is a diagrammatic view of the electrical connections illustrating certain modifications of the diagram shown in Figs. 26 and 27, to permit the use of a single speed table motor and a table controlled reversing switch for the spindle motor for the performance of milling operations during the travel of the table in both directions; and Fig. 29 is a diagrammatic view of the electrical connections illustrating a second modification of the diagram shown in Figs. 26 and 27, in which the table motor plugging switch is utilized to control the direction of drive of the spindle motor.

The machine illustrated in the drawings as embodying in a preferred form the several features of the present invention, comprises a manufacturing type milling machine in which the work is supported on a work support or table movable in a horizontal plane with relation to a vertically adjustable rotary milling cutter. The table is power driven by means of a reversible two-speed electric motor, and intervening driving connections which include a rotatable feed screw mounted on the table, a cooperating stationary nut, a slow traverse gear train, a quick traverse gear train, and a clutch connection movable from a neutral position to engage one or the other of said gear trains to drive the table alternatively at a feeding or quick traverse rate.

Referring more specifically to the drawings, a work supporting table is indicated at 40 mounted to slide on ways 42 formed on the base 44 of the machine. A rotary milling cutter spindle 46 is supported above the table in a casing 48 which is supported for vertical adjustment on the machine column 50. With the machine herein disclosed, the cutter spindle is driven by means of a separate motor 52 through connections generally indicated in dotted lines in Fig. 1.

The work table 40 is driven from a reversible two-speed electric motor 56 through direct connections which include slow feed and quick traverse gear trains and clutch connections for alternatively connecting one or the other of these trains to drive the table. As best shown in Figs. 10, 14 and 16, there is fast on the armature shaft 58 of the motor a gear 60 which meshes with a gear 62 secured to a connecting drive shaft 64. The shaft 64 is connected to drive the main drive shaft 66 of the machine at a slow traverse rate through gear connections comprising intermeshing take-off gears 70 and 72 secured respectively to the shaft 64 and to an idler shaft 74. A second gear 76 on the idler shaft 74 meshes with a gear 78 on a shaft 80 which carries a worm 82 meshing with a worm gear 84 loosely sleeved to turn on the drive shaft 66. The shaft 66 may be driven at a quick traverse rate from the shaft 64 through gear connections comprising a gear 86 secured to the shaft 64 which is arranged to mesh with a sleeve gear 88 mounted to turn on a short pivot shaft 90. A bevel gear 92 formed integrally with the sleeve gear 88 meshes with a corresponding bevel gear 94 loosely sleeved to turn on the drive shaft 66.

A slow speed and quick traverse clutch member 96 is rigidly secured to the driving shaft 66 between the slow feed worm 84 and the quick traverse bevel gear 94, and is provided at one end with a jaw toothed clutch 98 arranged to engage with a corresponding clutch member formed on the face of the worm gear 84, and at its other end is provided with a jaw toothed clutch face 100 arranged to engage with a corresponding jaw toothed clutch member formed on the adjacent face of the bevel gear 94. Movement of the slow feed and quick traverse clutch 96 to engage alternatively with the slow feed driving worm 84 or with the quick traverse bevel gear 84 is effected by an endwise movement of the driving shaft 66 controlled by means of a shifting rod 102 which passes through an axial bore in the drive shaft 66. A nut 104 and a collar 106 are secured to the shaft to engage with opposite ends of the drive shaft 66 to cause the drive shaft 66 to move axially with the shifting rod 102, while permitting the drive shaft to rotate with relation thereto. A heavy compression spring 108 coiled about the shifting rod 102 between a bearing plate 110 secured to the machine frame and the collar 106 on the rod 102 tends normally to hold the shaft 66 and clutch 96 to the left as viewed in Figs. 10 and 14 with the clutch face 98 in engagement with the slow feed worm gear 84. Movement of the drive shaft 66 and clutch 96 in an opposite direction to engage the quick traverse bevel gear 94 is effected by means of a solenoid 112, as shown in Fig. 10, which is provided with an armature 114 connected through a short link 116 to one arm of an actuating bell-crank lever 118 which is pivoted at 120 on the machine frame and has a pin and slot connection indicated at 122 with the end of the control rod 102.

The table 40 is driven from the drive shaft 66 through driving connections which comprise a rotatable feed screw 124 supported at each end in bearings in the table, and a stationary feed nut 126 (Fig. 11) which is rigidly supported against rotational or endwise movement in the machine frame so that rotational movements of the feed screw will cause corresponding endwise movements to be imparted to the feed screw and table 40. For rotating the feed screw 124 there is also keyed to turn therewith, a driving nut 128 which is externally supported in the machine frame to permit rotational movement thereof by means of roller bearings 130, and is held against lengthwise movement with relation to the frame by means of end thrust bearings 132 interposed between supporting brackets 133 and adjustable check nuts 134 screw-threaded to each end of the driving nut 128. For rotating the driving nut 128 and feed screw 124 to impart the required feeding movements to the table 40 from the drive shaft 66, an external gear 136 formed on the driving nut 128 is arranged to mesh with the idler gear 138, which in turn meshes with the driving gear 140 on the drive shaft 66.

In order to secure a tight operating engagement between the feed screw 124 and the stationary nut 126, and thus prevent any possible backlash or chatter in the table drive, there is provided with the present construction an additional nut 142 which is screw-threaded to the feed screw 124 and is keyed against rotation therewith on the machine frame. The nut 142 is moved axially with relation to the feed screw and to the fixed nut 126 by means of a take-up nut 144 provided with internal left and right screw threads which mesh with correspondingly threaded portions of the stationary nut 126 and additional nut 142.

The angular position of the take-up nut 144 to tighten or loosen the nut 142 and feed screw with relation to the fixed nut 126 is controlled, as best shown in Figs. 11 and 12, by means of a rock shaft 146 which is provided with a worm 148 arranged to mesh with a corresponding worm gear 150 formed on the take-up nut 144. A torsional spring 152 connected at one end to a collar 154 on one end of the rock shaft 146 and at its other end secured to a fixed plug 156 tends to rotate the rock shaft and take-up nut 144 connected thereto to impart a relative lengthwise tensioning strain to the nuts 126 and 142 to maintain a tight operating engagement between the feed screw and nut elements. In order to permit an adjustment of the take-up strain exerted by the spring 152, the plug 156 is mounted to turn in a bearing formed in the machine frame, and is held in an adjusted angular position by the engagement of a locking screw 155 with one of a series of corresponding recesses in the plug. A recess 157 is provided in the end of the plug to receive a tool for effecting this adjustment against the tension of the spring 152. The worm connections described permit the employment of a relatively light spring to secure a relatively heavy tensioning strain on the nuts, and at the same time provides an irreversible drive to positively prevent any easing off action of the nuts against the pressure of the spring. With this construction it will be seen that the entire strain upon the connections due to the operation of the cutter against the work is taken up against the fixed nut 126 to maintain a positive control of the position of the table under all conditions during feeding movements of the table in either direction.

With the present construction there is also provided mechanism which operates simultaneously with the movement of the slow feed and quick traverse clutch 96 to neutral or quick traverse position to ease off the take-up device so that a minimum of friction is provided in the connections to facilitate a manual or quick traverse operation of the table. This mechanism comprises a lever arm 158 which is mounted to turn on the rock shaft 146 and carries a pawl 160 arranged to engage with a ratchet 162 secured to the rock shaft 146. A compression spring 164 seated in the recess which carries the pawl tends to maintain the pawl in engagement with the ratchet 162. The lever arm 158 is connected by means of a link 166 to one arm of the actuating bell-crank 118 so that the movement of the bell-crank 118 and control rod 102 to move the slow feed and quick traverse clutch to neutral or to quick traverse position will cause the pawl to engage with and rotate the ratchet 162 and rock shaft 146 against the pressure of the take-up spring 152 to ease off the take-up device. For the retracted position of the lever arm 158 and pawl 160, as illustrated in Fig. 13, which corresponds to the slow feed position of the slow feed and quick traverse clutch 96, the pawl 160 is held out of contact with the ratchet by engagement of the pawl 160 with a cam surface 168 formed on a stationary collar 170 surrounding the rock shaft 146 adjacent the ratchet 162, so that the rock shaft 140 is free to turn under the pressure of the take-up spring 152 to secure the required tensioning strain on the feed screw and nut elements. With this construction and arrangement of parts it will be seen that a relatively small movement of the lever arm 158 and the pawl 160 is secured by the movement of the slow feed and quick traverse clutch 96 to neutral position, and a relatively greater movement is secured by the continued movement of the clutch 96 to quick traverse position so that the take-up device is only partially eased off when the clutch is moved to neutral position for the hand feed, and is wholly eased off only when the clutch is set for quick traverse operation of the table. This arrangement of the ease-off mechanism enables the operator to position the table by hand with the extreme accuracy required, while at the same time the frictional resistance in the connections is sufficiently reduced to permit a relatively easy manipulation of the table.

The illustrated machine is provided with hand feed operating connections together with a control mechanism therefor which is arranged normally to maintain the hand feed out of operation, and acts when rendered operative to permit the engagement of the hand feed and simultaneously to move the slow feed and quick traverse clutch to neutral position. The hand feed operating connections, as best shown in Figs. 14 and 15, comprise a forwardly extending shaft 172 which is mounted for axial and rotational movement in a bearing 174. At its forward end the shaft is provided with a squared end 176 to receive a manually operable crank handle of ordinary description, and at its rear end carries a gear 178 arranged to mesh with a corresponding crown gear 180 on the drive shaft 66. It will be seen from an inspection of Fig. 14 that the shaft 172 may be moved rearwardly to bring the gear 178 into operative engagement with the crown gear 180 only for a lengthwise position of the drive shaft 66 which corresponds to the neutral or intermediate position of the slow feed or quick traverse clutch 96.

The mechanism for controlling the operation of the hand feed comprises a plug 182 journalled in the casing 184 axially in alignment with the drive shaft 66. At its inner end the plug is provided with a bearing surface arranged to engage with the end of the shifting rod 102, and with an offset cam 186 arranged to engage with the face of the gear 178 on the inner end of the hand feed shaft 172. For controlling the operation of the plug 182 to impart lengthwise and rotational movements thereto, a hand lever 188 is secured to the side of the plug 182 and extends outwardly through a cam slot 190 in the casing 184. With the plug in the normal inoperative position shown in Figs. 14 and 15, the block is withdrawn out of engagement with the shifting rod 102, and the cam 186 is positioned to lock the hand feed shaft 172 and gear 178 in a retracted position out of engagement with the crown gear 180. When it is desired to throw the hand feed into operation, the control lever 188 is moved downwardly to the dotted position shown in Fig. 15 to rotate the plug, and at the same time to cause it to be advanced through the engagement of the control lever 188 with the cam slot 190 above described. This movement of the plug acts to move the cam 186 to permit a forward movement of the hand feed shaft 172, and simultaneously moves the shifting rod 102, the drive shaft 66 and clutch 96 to the right, as shown in Fig. 14 against the pressure of the spring 108 to throw the clutch 96 into neutral, and to position the crown gear 180 for engagement with the gear 178 on the hand feed shaft 172.

The hand feed connections above described are constructed and arranged so that the operator can operate the machine at quick traverse, if so desired, without returning the hand feed connections to inoperative position. When the solenoid is energized by the operator to move the control rod 102 and clutch 96 against the pressure of its spring 108 to quick traverse position, the corresponding movement of the crown gear 180 to the right, as shown in Fig. 14, will disengage the crown gear from the gear 178 on the hand feed shaft 172, thus disconnecting the hand feed without altering its position. When the solenoid is again de-energized to arrest further quick traverse operation of the table, the control shaft 102 and clutch 96 will move to the left under the pressure of the spring 108 to its neutral position where it will be engaged by the plug 182, bringing the crown gear 180 again into mesh with the gear 178 on a hand feed shaft 172.

In carrying out the present invention, a number of electrically operated devices have been provided for controlling the operation of the machine, and more particularly of the work supporting table, which embody a number of new and useful features peculiarly applicable to milling and similar machines provided with a movable work supporting table of the general type herein disclosed. As above pointed out, there is embodied in the present construction a reversible two-speed motor which is directly connected to drive the table in either direction at either of two predetermined rates. This arrangement of the table drive permits the use of a highly efficient and versatile electrical control mechanism which may be operated automatically by table dogs, or manually to secure a satisfactory and extremely accurate operation of the table for a wide variety of operating conditions.

In accordance with one feature of the present invention, electrical connections are provided which are controlled automatically during the operation of the table to vary the motor speed, so that the feeding rate may be automatically adjusted to varying conditions in the making of a cut without the necessity of stopping the machine or of shifting clutch connections under load. In order to effect the required adjustment of the motor to the required speed, a mercury switch is provided, as best shown in Figs. 8 and 9 and in the electrical diagram Fig. 26, which comprises a mercury tube 191 partially filled with mercury supported in a clip or bracket 192 secured to a rock shaft 193 supported to turn in a bearing 194 on the rear side of the machine frame. An input wire 2 and high speed and low speed connections 23 and 24, are connected respectively to the middle and two ends of the tube 191, so that a contact will be established from the line 2 alternatively to the high speed connection 23 or the low speed connection 24 through the mercury as the tube is tipped in either direction by the rocking of the shaft 193. The angular position of the rock shaft 193 to determine the setting of the mercury switch is controlled by means of dogs A and B which are adjustably supported in a T-shaped slot 195 formed in the rear side of the table, and are arranged to engage respectively with correspondingly cammed surfaces on the upper ends of two vertically movable plungers 196 and 197 which have formed thereon racks arranged to mesh with opposite sides of a pinion 198 mounted on the rock shaft 193. The cam portions of the plungers 196 and 197 and of the dogs A and B, are offset with relation to each other, so that the plunger 196 when raised will be positioned only in the path of the dog A, and the plunger 197 similarly will be positioned only in the path of the dog B. The manner in which the dogs will operate to control the position of the mercury switch under a variety of different operating conditions, will be hereinafter described in connection with Figs. 17 to 25 inclusive of the drawings, illustrating the set-up of the automatic control dogs for the milling of different varieties of work.

The electrical connections herein disclosed, and as will hereinafter be more fully described in connection with the wiring diagram Fig. 26, are arranged simultaneously to shift the slow feed and quick traverse clutch to quick traverse position, and to connect the table driving motor for high speed operation, so that a maximum speed quick traverse is always obtained regardless of the setting of the mercury switch for power feed operation.

The electrical connections herein disclosed are arranged for automatic operation from the table or for manual control by means of a simple arrangement of switch control buttons which comprise left and right feed buttons and left and right quick traverse buttons. With the arrangement of the electrical connections hereinafter to be described in connection with the electrical diagram Fig. 26, the rate of travel of the table may be varied to effect either slow feed or quick traverse movement of the table at any point in the table travel in either direction, or the direction of travel of the table may be reversed at either a slow feed or quick traverse rate by pressing the designated button for establishing the required rate and direction of travel of the table. The switch contact buttons for controlling the direction and rate of feed of the support are mounted as best shown in Figs. 1, 4 and 5, in a control post 199 which is located adjacent one side of the table. These buttons are arranged in two series, and comprise buttons 200 mounted on the table side of the control post to cooperate with corresponding dogs on the table to control the direction and rate of feed of the table, and a second series of manual control buttons 201 mounted on the opposite side of the control post to permit the convenient operation of the controls by hand.

There are four automatic control buttons which are mounted in vertical alignment and comprise as marked on the drawings, left and right feed buttons, and left and right fast traverse buttons. The dogs which it is proposed to use for controlling the operation of the automatic switch control buttons 200, are shown in Figs. 2 and 3, and comprise preferably a feed right dog 202, the feed left dogs 203 and 211, a quick traverse right dog 204, and a quick traverse left dog 205. Each of these dogs, as best shown in Figs. 4 and 5, is pivotally supported on a bracket 206, and is held in operative position by means of a spring 207 coiled about its pivot. The brackets are adjustably supported lengthwise of the table in a T-shaped slot 208. There are also provided two quick traverse reversing dogs indicated respectively at 209 and 210 which are rigidly formed on brackets arranged to be mounted in the T-shaped slot 208.

For each of the automatic control buttons 200, there is a corresponding manual control button 201 mounted on the opposite or front side of the control post 199. The switch connections operated by the respective buttons comprise four switches which may be operated by the pressing of either of the corresponding automatic or manual control buttons. Each of these switches, as best shown in Figs. 4, 5 and 6, comprises two stationary double contact members 212 and 214 through which are journaled a central plunger or shaft 216 which has mounted on one end the automatic control button 200, and at its other end is provided with a groove 218. The position of the plunger 216 is controlled from the corresponding manual control button 201 by means of an actuating lever 220 pivoted at 222 on the control post and provided at one end with a fork engaging in the groove 218, and at its other end with a bearing surface to engage with the manual control button 201. Intermediate its length the plunger or shaft 216 is provided with a reduced portion 224 on which are mounted two double contact arms 226 and 228 which are arranged to engage respectively with the contact members 212 and 214, and are held yieldingly in an extended position against the ends of the reduced portion 224 of the plunger by means of a small compression spring 230. The plunger 216 is forced yieldingly to the rear to maintain both control buttons in their extended positions, with the contact arm 228 in open position, and with the contact arm 226 in closed position by means of a compression spring 232 coiled about the plunger 216 between a collar 234 on the plunger and the stationary contact member 212. With this construction and arrangement of the parts, the pressing of one of the automatic buttons 200 or its corresponding manual control button 201, will operate to move the corresponding plunger 216 against the pressure of its spring 232 to disengage the contact arm 226 and at the same time to engage the contact arm 228 with the stationary contact member 214.

To insure the stopping of the table at the limit of its movement in either direction, and thus to prevent possible damage to the parts, two additional automatic control stop buttons 236 are provided mounted on a stationary portion of the machine frame, and are arranged for engagement with corresponding dogs 237 mounted in the slot 208 on the table.

In order to permit the operator readily to disengage the automatic controls so that the table may be operated entirely by manipulation of the hand switch buttons 201, the control post 199 is provided on its under side with a cylindrical post 238 which is arranged to turn in a bearing 240, so that the control post may be readily turned to move the automatic control buttons 200 out of the path of their respective dogs. The control post 199 is normally held in operative position with the automatic control buttons 200 in the path of the table dogs, by means of a spring-pressed plunger 242 which is journalled in a vertical recess 244 formed in the bearing support 240, and is provided at its upper end with a tapered pin 246 which is arranged to engage with a corresponding recess 248 formed in the under side of the post 238. The plunger 242 is held yieldingly in engaging position by means of a compression spring 252 coiled about the plunger between a shoulder formed on the recess and a shoulder on the plunger. A knurled head 254 provided on the outer or lower end of the plunger permits convenient operation by the operator. It will be noted, however, that the movement of the control post 199 out of position does not affect the operation of the safety stop buttons 236 which, as above stated, are supported on a fixed portion of the machine frame.

In order to assist in bringing the driving motor to an immediate stop, and thus accurately to determine the limits of movement of the table in either direction, there is included in the electrical connections herein disclosed, a plugging switch for plugging or electrically reversing the motor to a stop which is rendered operative upon actuation of one of the stop buttons, or upon actuation of the proper slow feed or quick traverse button to reverse the direction of table travel. A specific form of mechanism for controlling the operation of the plugging switch as set forth in the following description of the electrical diagrams Figs. 26 to 29 inclusive, is fully illustrated and described in the copending application of the present applicants, Serial No. 714,808, filed March 9, 1934 of even date herewith, but may be briefly described as follows in connection with Fig. 27 of the drawings:—The plugging switch contact members 255 are supported on a plunger 256 supported for axial movement in a bore formed in the casing of a reversible oil pump 257 which is driven directly from the armature shaft of the table driving motor. A centering spring 258 tends normally to maintain the switch contact members 255 in a neutral intermediate position.

A sleeve piston is mounted on the lower end of the plunger 256 and is arranged to cooperate with a system of check valves and conduits leading from each side of the pump gears so that the rotation of the table motor and pump gears driven thereby in one direction to drive the table to the right will move the plunger 256 and contact arms 255 downwardly to energize the relay coil CRR through the contacts 2—61, and similarly the rotation of the table motor and pump gears driven thereby in an opposite direction to drive the table to the left will move the plunger 256 and contact arms 255 upwardly to energize the relay coil CRL through the contacts 2—59.

As the motor and pump gears are brought to a stop at the end of the table travel, the plunger 256 and contact arms 255 are returned again to their neutral position under the influence of the centering spring 258.

It has been found under certain operating conditions, as for instance, where in feeding against a shoulder it is desired to reverse the direction of table movement at a quick traverse rate by the actuation of the designated quick traverse button, that the solenoid 112 if immediately energized, will act to shift the slow feed and quick traverse clutch to quick traverse position prior to the complete stopping of the motor. The resulting increase in speed of table travel due to the shifting of the clutch during the continued forward rotation of the motor, tends to cause the cutter to jump into the work, interfering seriously with the accurate timing of the reversal in table drive, and also tending to place an excessive load on the cutter. In order to avoid this difficulty, one feature of the present invention contemplates the provision of electrical connections controlled by the plugging switch above referred to, which act to delay the operation of the solenoid 112 to move the clutch to quick traverse position until after the reversal of the motor has taken place, so that all danger of placing an excessive load on the motor is eliminated, and the shifting of the clutch during the operation of the table under load with the consequent wear on the clutch connections is avoided.

The construction and operation of the electrical connections for controlling the operation of the table and cutter spindles respectively through their driving motors, will be briefly described in connection with the electrical wiring diagram Fig. 26 and the explanatory diagrams 27 to 29 inclusive, so far as necessary to make clear the connection therewith of the several new and improved features of construction and operation of the machine above set forth.

The table driving motor 56 and the spindle driving motor 52 are driven from a three phase power line designated as $L^1$, $L^2$ and $L^3$. The table motor is controlled by means of a reversing switch having two exciting relays L and R.

The main switch for the table motor is supported on a panel indicated in dotted lines at 259 in Fig. 26, and comprises two sets of contacts which are controlled by the relay coils R and L respectively to connect the motor and table for right or left hand operation. A high speed and low speed switch for the table motor 56 is also mounted on the panel 259, and comprises two sets of contacts controlled respectively by the relay coils HS and LS for high speed or low speed operation of the table motor.

On another panel indicated at 260 in dotted lines, are carried the main switch contacts for the spindle motor 52 controlled by means of two relay coils SF and SR for opposite directions of rotation of the motor and spindle driven thereby.

There are also provided on a panel 261 designated in dotted lines in Fig. 26, a number of secondary relay switches, which are arranged to control the operation of the table and spindle switches above described together with the solenoid 112 which operates the slow feed and quick traverse clutch 96. These secondary relays comprise the secondary coils LR and RR controlled respectively by the left and right feed buttons, the coils TL and TR controlled respectively by the left and right quick traverse buttons, a relay coil RC which controls the operation of the slow feed and quick traverse solenoid 112, and also has connections which are arranged under certain operating conditions to control the operation of the high speed table motor and the spindle motor switches.

Two additional secondary relay coils CRR and CRL, also supported on the panel 261, are provided in the circuit controlled by the plugging switch designated at 255, and operate in connection therewith to apply a braking torque for plugging the motor to rest upon stopping or reversing the drive of the table, and also to delay the operation of the solenoid 112 to shift the clutch to quick traverse position upon reversal at a quick traverse rate.

Assuming a rest position of the machine, and that it is desired to start the machine feeding to the left, pressing the "Feed Left" button energizes the LR coil. LR contacts 4—3 now close to form a holding circuit. LR contacts 2—19 close energizing the main contacting coil L to start the table motor, and LR contacts 2—27 also close to energize either the SF or SR coil to start the spindle motor. The pressing of the "Feed Right" button with the machine at rest will operate similarly to start the table feeding to the right. At this point it may be noted that when the table moves to the left, the plugging switch contacts 2—17 open and the contacts 2—18 close, due to the closing of plugging switch L contacts 2—59 and the energizing of plugging switch contacting coil CRL. Similarly, when the table moves to the right, the plugging switch contacts 2—16 open and 2—15 close, due to the closing of plugging switch R contacts 2—61.

Assuming that the table is feeding left with the coils LR, L and SF energized, and the plugging switch relay contacts 2—16 on CRR and 2—18 on CRL closed, and that it is desired to stop the machine by pressing the "Stop Left" button, the operation of the electrical connections is as follows:—The pressing of the "Stop Left" button de-energizes the coil LR, causing the LR contact 2—19 to open and disengage the main contactor L. Simultaneously, the LR contact 18—22 closes and establishes a circuit to the main contactor coil R through CRL contacts 2—18 to electrically reverse or plug the table motor. The LR contacts 2—27 also open, but the spindle switch is held closed by means of the SF interlock 26—27 and the L or R interlock 2—26, since the L and R switch contacts are arranged so that one closes before the other opens. When the table motor is practically stopped, the plugging switch relay CRL is deenergized and the contact 2—18 opened to de-energize the main contactor coil R, thus disconnecting the table motor. Simultaneously, the interlock 2—26 opens to disconnect the spindle.

Assuming that it is desired to operate the table at a quick traverse rate to the left from a rest position, the pressing of the "Fast Left" button will energize the TL coil, causing the TL contacts 3—5 to close and energize the coil LR which acts as above described to start the table motor. The TL contacts 16—20 and 20—21 also close and energize the coil RC through the CRR contacts 2—16. The RC contacts 2—31 now close to energize the solenoid 112, shifting the clutch to quick traverse position. At the same time RC contacts 25—6 open to disconnect the spindle circuit, and also to disconnect the low speed coil LS. RC contact 2—23 also closes to energize the high speed contactor HS regardless of the position of the mercury switch above described. The closing of the quick traverse "Fast Right" button will operate similarly to start the machine in operation at a quick traverse rate to the right from rest position.

If it is now desired to stop the machine operating to the left at a quick traverse rate, the pressing of the "Stop Left" button will operate as follows:—At this time the coils LR, TL, L, RC and the solenoid are energized. The pressing of the "Stop Left" button de-energizes LR and TL. The opening of LR in conjunction with the plugging switch, plugs the table motor to rest as above described. At the same time the opening of the TL contacts 20—21 deenergizes the coil RC. RC contacts 25—6 now close, but the spindle is prevented from starting while the motor is being plugged to rest, since LR has opened and the spindle interlocks 26—27 are open. The machine may be stopped similarly during the quick traverse operation of the table to the right by the pressing of the "Stop Right" button.

Assuming now that the table is operating at a quick traverse rate to the left, and that it is desired to shift to a slow feed rate in the same direction, the "Feed Left" button is pressed, causing the contacts 5—6 to open, thus de-energizing the TL coil. The TL contacts 20—21 now open de-energizing the RC coil. The RC contacts 2—31 open, de-energizing the clutch shifting solenoid which permits the return of the clutch to its feed position. Simultaneously, RC contacts 25—6 close, energizing the spindle contactor SF or SR through the LR interlock. The RC contacts 2—23 also open, so that if the mercury switch is in its slow speed position, the HS coil is de-energized and the LS coil is energized to close the slow feed contacts for the motor. The shift from quick traverse right to slow feed in the same direction is similarly accomplished by the pressing of the "Feed Right" button. In order to shift from slow feed to quick traverse in the same direction, it is necessary only to press the corresponding quick traverse button. The operation of the connections is a reversal of the procedure outlined in connection with the shift from quick traverse to feed, and is thought to be sufficiently clear without further explanation.

The connections herein described are also adapted to permit a shift from slow feed in one direction to a quick traverse movement of the table in the opposite direction. If it be assumed that the table is feeding to the left, the pressing of the "Fast Right" button will operate to reverse the direction of movement of the table at a quick traverse rate, as follows:—The contactors LR, L, LS and SF may be assumed to be closed as well as the plugging switch relay contacts 2—16 and 2—18. The pressing of the "Fast Right" button energizes coil TR. TR contacts 10—11 close, energizing the coil RR. TR contacts 17—20 and 20—21 close, but the RC coil is not at this time energized to shift the clutch, because of the fact that the contacts 2—17 are still open. RR contacts 2—4 open, de-energizing LR which opens the main contactor L. RR contacts 14—10 also close, forming a holding circuit through LR contacts 2—14 which also close. RR contacts 2—22 energize the main contactor R, electrically reversing the motor. After the motor has practically stopped, the CRL contacts 2—17 close, energizing the coil RC to energize the solenoid, disconnecting the spindle, and shifting the driving motor speed from low speed to high speed as above described. The shift from a slow feed of the table to the right to a quick traverse left may be similarly accomplished by pressing the "Fast Left" button.

Assuming that it is desired to shift from a slow feed left to a slow feed right, the "Feed Right" button is pressed to reverse the direction of operation of the table. The operation of the connections to effect this shift are substantially those described in connection with the shift from a slow feed to a quick traverse in the opposite direction, except that TL is not energized, so that the RC coil does not pick up when the plugging switch operates.

A shift from rapid traverse in one direction to a rapid traverse in the other direction, is accomplished by pressing the proper quick traverse button. Assuming a rapid traverse operation of the table to the left with LR, TL, L, RC, HS and the solenoid energized, the pressing of the "Fast Right" button will now act to energize TR. The contacts 20—21 on TR close, thus holding RC in through its interlock 2—20. TR contact 10—11 also closes, energizing RR. RR contact 2—4 opens, de-energizing the coil LR, and RR contacts 14—10 close, forming a holding circuit. RR contacts 2—22 also close to energize the coil R, so that the main contactors R close after the LR contacts 2—19 have opened to release L. It will be noted that the operation of the electrical connections as above described, permit the reversal of the table at a quick traverse rate without releasing the solenoid, so that there is no tendency for the clutch to shift to its slow feed position at this time.

The manner in which the control dogs are set up for milling operations on different classes of work, and the mode of operation of the machine in connection therewith, is illustrated in Figs. 17 to 25 inclusive, for several classes of milling operation which a machine of this description is frequently called upon to perform.

Fig. 17 together with the accompanying diagram Fig. 20, illustrates one class of milling operations in which the cutter performs a milling operation along a plane surface and against a shoulder, and is then withdrawn to its original inoperative position. In this case the cutter operates under a relatively light load during the first portion of the cut and under a relatively heavy load in milling the shoulder. In the performance of this operation, the quick traverse right button is pushed manually to bring the table rapidly into operating position. Just prior to the engagement of the work by the cutter, the slow feed right button is pressed by its dog 202 to shift the slow feed and quick traverse clutch to slow feed position, and to start the spindle motor. It will be assumed that at this time the table motor is operating at high speed due to the setting of the mercury switch, so that the cut along the plane surface will be at a relatively rapid feed rate. Before the cutter reaches the shoulder, the mercury switch is shifted to slow speed position to further retard the rate of advance of the table by the engagement of the table dog B with the corresponding plunger 197 for controlling the switch. As the cutter is finally fed into depth with relation to the shoulder, the direction of table drive is reversed at a quick traverse rate through the pressing of the quick traverse left button by its dog 210. As above pointed out, this operation serves to shift the clutch to quick traverse position, to reverse the table driving motor at high speed, and to disconnect the spindle motor, so that the table is returned at a quick traverse rate to its original position where it is again stopped by the pressing of the "Stop Left" button by its corresponding dog 237. During this return movement of the table to the left, the mercury switch is again shifted to its high speed position preparatory for the next cutting operation, by the engagement of the dog A with the corresponding plunger 196 on the switch.

Fig. 18 together with the accompanying diagram Fig. 21 illustrates a class of milling operation in which the load on the cutter varies during the milling operation in a somewhat different manner. In this case the cutter is face milling a surface of variable width in which a relatively heavy load is placed on the cutter during the first portion of the cut, and a relatively light load on the latter portion of the cut. As in the first case, the table is moved into operating position by the pressing of the manual quick traverse right button, and is reduced to a slow feed rate prior to the engagement of the cutter with the work through the pressing of the slow feed right button by its corresponding dog 202. It will be assumed that at this time the mercury switch is set at its slow speed position, so that the table motor is automatically reduced to its slow speed setting upon the actuation of the slow feed right button. As the milling operation proceeds and the surface being cut narrows reducing the load on the cutter, the dog A is arranged to engage with its corresponding plunger 196 to shift the mercury switch to high speed position, and thus to increase the feeding rate of the table. After the milling operation is completed, the table is returned to its original position by the engagement of the quick traverse left button by its corresponding dog 210, so that the direction of rotation of the motor is reversed, the clutch is shifted to quick traverse position, and the spindle motor is stopped to prevent possible scratching of the work. As the table again reaches its extreme left position, it is stopped by the engagement of the "Stop Left" button by its dog 237. During the return movement of the table to starting position, the mercury switch is again set in its slow speed position by the engagement of the dog B with the corresponding plunger 197 on the switch.

Fig. 19 together with the accompanying diagram Fig. 22 illustrates a class of milling operations in which a relatively heavy or roughing cut is made on a plane surface during the travel of the table in one direction, and a relatively light finishing cut is made during the return movement of the table in the opposite direction. Assuming the table to be at its starting position at the extreme left for loading, the operator presses the quick traverse right button to bring the table rapidly into operating position. Just prior to the engagement of the work by the cutter, the slow feed right button is engaged by its dog 202 to shift the clutch to slow feed position and to start the spindle motor. Assuming that the mercury switch at this time is in its slow speed position, the table driving motor will at the same time be shut down to its slow speed, so that the roughing cut will be at a slow rate. After the completion of the cut, the dog A engages with the corresponding plunger 196 on the mercury switch to shift the switch to its high speed position. The direction of drive of the table is now reversed at its feeding rate by the engagement of the feed left button by the dog 211. The finishing cut now takes place at the higher feed rate. Finally, as the cutter passes beyond the end of the work, the quick traverse left button is engaged by its dog 205 to return the table at a quick traverse rate to its original position. At this time also, the dog B is arranged to engage with its corresponding plunger 197 to turn the mercury switch to its slow speed position.

In order to adapt the present machine for the most efficient operation under a wide variety of operating conditions, two modified forms of the electrical control system have been devised which are particularly arranged to permit milling operations to be performed on one or more work blanks consecutively, during the travel of the table in opposite directions. The first modification, as shown in Fig. 28, illustrates certain specific changes in the wiring diagram Fig. 27, which contemplate the use of a single speed electric motor, and in which the mercury switch controlled by dogs mounted on the back side of the table is employed to reverse the direction of the cutter spindle drive. With the use of a single speed electric motor for driving the table, the HS and LS contactor coils are eliminated, and the mercury switch 191 is arranged to take the place of the manually operable switch connections 27—28 and 27—29 for energizing alternatively the SF or SR coils to drive the spindle motor in forward or reverse. If it be now assumed that the machine is set up with two work blanks 264 and 266 on which milling operations are to be performed by means of the two oppositely faced cutters 260 and 262, as illustrated for instance in Figs. 23 and 24, the dogs A and B on the back side of the table will be positioned to engage with their respective plungers 196 and 197 during the travel of the table in opposite directions to determine the direction of rotation of the cutter spindle prior to the engagement of the work blank with the corresponding cutter. The location of the dogs A and B may readily be determined by the operator in accordance with the location of the work on the support, and to produce either plain or hook milling as may be desired.

Fig. 29 illustrates a second modification of the wiring diagram in Fig. 27, to provide means for reversing the drive of the spindle motor through electrical connections which are controlled from the plugging switch of the motor. This modification of the machines contemplates the use of a two-speed driving motor for the table, and electrical connections controlled by the plugging switch for reversing the direction of rotation of the spindle motor simultaneously with the reversal in the direction of table drive. As shown in Fig. 29, two CRL and CRR contactors have been added which may be connected through selector switches 280 and 282 respectively with either the SF or SR coils for driving the spindle motor. The contactors CRL and CRR are controlled by the table plugging switch, and close as a function of the direction of travel of the table. The CRL contact closes when the table travels left, and makes the upper selector switch 280 effective to energize either the SF or SR coil in accordance with the setting of the switch. Similarly, the CRR contact closes when the table travels right and makes the lower selector switch 282 effective to energize either the SF or SR coil for driving the spindle motor. With this arrangement of parts it will readily be seen that the spindle may be reversed with each change in direction of travel of the table and also may be made to travel in the same or in opposite directions with relation to the table during the forward and return movement of the table, dependent upon the setting of the two selector switches.

Following the diagram set forth in Fig. 25, which illustrates the mode of operation of a table driven by a single speed motor in accordance with the electrical diagram set forth in Fig. 28, the table may be started from an intermediate position by the pressing of the "Fast Right" button. As the table now moves to the right at a quick traverse rate, the engagement of the dog A with the corresponding plunger 196 will operate the mercury switch to determine the direction of rotation of the cutter spindle. The table will continue at a quick traverse rate to the right until the "Feed Right" dog 202 is reached just prior to the engagement of the cutter 262 with the work blank 266. At the end of the operation, the table is reversed at a quick traverse rate by the reversing dog 210. The table is now moved to the left, causing the dog B to engage with the plunger 197 to reverse the setting of the mercury switch to reverse the direction of rotation of the cutter spindle 46. Continued movement of the table to the left will cause the dog 203 to engage the "Feed Left" button just prior to the engagement of the cutter 260 with the work blank 264. At the completion of the operation on the blank 264, the table will be brought to a stop by the engagement of the stop dog 237 with the corresponding button 236.

A machine having the construction and arrangement of the operating controls set forth in the second modification above described and illustrated in Fig. 29 will operate to perform a milling operation during the travel of the table in each direction as follows: The pressing of the "Fast Right" button will cause the table to be moved to the right at a quick traverse rate until, as in Fig. 25, the right feed dog 202 is reached just prior to the engagement of the cutter 262 with the work blank 266. At the end of the operation the table is reversed at a quick traverse rate by the reversing dog 210. At the same time the operation of the plugging switch will cause the contacts CRR illustrated in Fig. 29 to open and the contacts CRL to close, thus connecting the spindle motor for operation in the reverse direction. The table is now moved to the left at a quick traverse rate until the dog 203 is brought into engagement with the feed button to reduce the rate of advance of the table to a feeding rate. At the completion of the operation on the blank 264, the table will be brought to a stop by the engagement of the stop dog 237 with the corresponding stop button 236. Inasmuch as the electrical connections illustrated in Fig. 29 operate to cause the reversal of the spindle motor automatically with the reversal in the direction of table drive through the operation of the plugging switch described, the subsequent movement of the table to the right at the beginning of a new operation will act automatically again to reverse the spindle drive.

The nature and scope of the invention having been indicated, and a machine embodying the several features of the invention having been specifically described, what is claimed is:—

1. In a machine tool, the combination with a rotary milling cutter supporting spindle, a movable work support, driving means for said support comprising a rotatable feed screw, a relatively stationary nut threaded thereto, a second nut threaded to the feed screw keyed against rotation with relation to said former nut, means for rotating the feed screw for imparting feeding movements to the support, and a take-up device for controlling the relative axial positions of the nuts to maintain a tight working engagement between the nuts and the feed screw comprising a take-up nut having a left and right screw-threaded engagement respectively with said nuts, a worm gear on said take-up nut, a worm engaging therewith, and a torsional spring for rotating the worm to secure a tight operating engagement between said feed screw and nut elements.

2. In a machine tool, the combination with a rotary milling cutter supporting spindle, a movable work support, driving means for said support comprising a rotatable feed screw, a relatively stationary nut threaded thereto, a second nut threaded to the feed screw keyed against rotation with relation to said former nut, means for rotating the feed screw for imparting feeding movements to the support, and a take-up device for controlling the relative axial positions of the nuts to maintain a tight working engagement between the nuts and the feed screw comprising a take-up nut having a left and right screw-threaded engagement respectively with said nuts, a worm gear on said take-up nut, a worm engaging therewith, a torsional spring for rotating the worm to secure a tight operating engagement between said feed screw and nut elements, and means for adjusting said spring to adjust the take-up tension exerted thereby.

3. In a machine tool, the combination of a tool, a movable work support, driving means for said support comprising a rotatable feed screw, a relatively stationary nut threaded thereto, a second nut threaded to the feed screw keyed against rotation with relation to said former nut, means for rotating the feed screw to impart feeding movements to the table, and a take-up device for controlling the relative axial positions of the nuts to maintain a tight working engagement between the nuts and the feed screw comprising a take-up nut having a left and right screw-threaded engagement respectively with said nuts, a worm gear on said take-up nut, a worm engaging therewith, a torsional spring for rotating the worm to secure a tight operating engagement between said feed screw and nut elements, and means acting when rendered operative to rotate the worm in an opposite direction from its take-up position to secure a free operating engagement between said feed screw and nut elements.

4. In a machine tool, the combination of a tool, a movable work support, driving means for said support comprising a rotatable feed screw, a relatively stationary nut threaded thereto, a second nut threaded to the feed screw keyed against rotation with relation to said former nut, means for rotating the feed screw to impart feeding movements to the support, and a take-up device for controlling the relative axial positions of the nuts to maintain a tight working engagement between the nuts and the feed screw comprising a take-up nut having a left and right screw-threaded engagement respectively with said nuts, a worm gear on said take-up nut, a worm engaging therewith, a torsional spring for rotating the worm to secure a tight operating engagement between said feed screw and nut elements, a lever, and a pawl and ratchet connection between said lever and said worm rendered operative upon movement of the lever in one direction to engage and rotate said worm against the pressure of said spring to secure a free operating engagement between the feed screw and nut elements.

5. In a machine tool, the combination of a milling cutter, a cutter support, a work support, a feed screw, a pair of nuts threaded to said feed screw, means for imparting relative rotational movements to the screw and nuts to feed one of said supports, comprising a reversible electric motor, a slow feed train, a quick traverse train, a slow feed and quick traverse clutch, spring means tending to maintain the clutch in its slow feed position, a take-up device for controlling the relative positions of the nuts comprising spring means tending to position the nuts to maintain a tight working engagement between the nuts and the screw, and means acting when rendered operative simultaneously to move the said clutch to quick traverse position and to relatively move the nuts against the pressure of said spring means to provide a free operating engagement between said feed screw and nut elements.

6. In a machine tool, the combination of a milling cutter, a movable work support, a feed screw, a pair of nuts threaded to said feed screw, means for imparting relative rotational movements to the screw and nuts to feed said work support comprising a reversible electric motor, a slow feed train, a quick traverse train, a slow feed and quick traverse clutch, spring means tending to maintain the clutch in its slow feed position, a take-up device for controlling the relative positions of the nuts comprising spring means tending to position the nuts to maintain a tight working engagement between the nuts and the feed screw, a control member for said clutch, a mechanical connection from said control member for controlling the operation of said spring means, and an electromagnet acting through said control member when energized to engage said clutch in quick traverse position, and simultaneously acting through said mechanical connection to render said spring means inoperative to permit a free operating engagement between the feed screw and nut elements.

7. In a machine tool, the combination of a rotary milling cutter spindle, a movable work support, driving means for reciprocating said support comprising a prime mover, driving connections for operating the table from said prime mover alternatively at a slow feed or quick traverse rate, and means for controlling the operation of the machine comprising a control post, control members for controlling the direction and rate of movement of said support mounted on the post, dogs mounted on the support for operating said control members, and a mounting for said post arranged to permit the movement of the post and the members supported thereon out of the path of the dogs.

8. In a machine tool, the combination of a rotary milling cutter spindle, a movable work support, driving connections for said support including means for reversing the direction of drive, means for adjusting said connections to drive the support at a plurality of slow feed and quick traverse rates, and control devices for controlling automatically the operation of the support comprising a relatively stationary control post adjacent said support, control members mounted on said post to control the direction and rate of movement of said support, dogs mounted on the table for operating said members, a mounting for said post arranged to permit a movement of the post and members supported thereon out of the path of the dogs, stop members mounted on a stationary portion of the machine frame, and cooperating dogs on the table arranged to engage therewith at the end of the support travel in each direction to arrest the further advance of the support.

9. In a machine tool, the combination of a tool, a movable work support, driving connections for said support including means for reversing the direction of drive, means for adjusting said connections to drive the support at a plurality of slow feed and quick traverse rates, and devices for controlling the operation of the table comprising a relatively stationary control post adjacent said table, dogs mounted on the table, control members supported on said post arranged for engagement with said dogs to control the direction and rate of movement of the support, manual control members supported on said post for manually controlling the direction and rate of movement of the support, and a mounting for said post arranged to permit a movement of the post and automatic control members supported thereon out of the path of the dogs.

10. In a machine tool, the combination of a tool, a movable work support, driving connections for said support comprising a reversible electric motor, a reversing switch for the motor, electrically operated devices for varying the rate of movement of said support, a stationary control post supported adjacent said support, dogs on the support, switch control buttons on the control post arranged for engagement with said dogs to control the operation of said reversing switch and the rate of movement of the support, additional manually operable switch control buttons on the control post for manually controlling said reversing switch and said means for controlling the rate of movement of the support, and a mounting for said control post arranged to permit the movement of the control post and the switch buttons thereon out of the path of the dogs.

11. In a machine tool, the combination of a tool, a movable work support, driving connections for said support, and means for controlling the operation of said driving connections comprising a control post located adjacent the movable support, dogs mounted on the support, members supported on the post arranged for engagement with said dogs to control the operation of said driving connections, and a pivotal mounting for said control post arranged to permit the control post and members supported thereon to be turned out of the path of the dogs.

12. In a machine tool, the combination of a rotary milling cutter supporting spindle, a movable work support, a reversible electric motor for driving said work support, driving connections including a slow feed and quick traverse clutch for driving the table from the motor at a plurality of slow feed and quick traverse rates, a reversing switch for the motor, and control means for the table comprising a control post supported adjacent said table, dogs mounted on the table, control members supported on the post actuated by engagement with the dogs to control the operation of said switch and clutch, and supporting means for the post arranged to permit the movement of the post and the members supported thereon out of the path of the dogs.

13. In a machine tool, the combination of a rotary milling cutter supporting spindle, a movable work support, a reversible electric motor for driving the table, a reversing switch for the motor, driving connections for the motor including a slow feed and quick traverse clutch arranged to drive the table alternatively at a slow feed or quick traverse rate, spring means tending to maintain said clutch in its slow feed position, an electromagnet acting when energized to move said clutch to quick traverse position, a control switch therefor, a control post adjacent one side of the table, dogs adjustably supported on the table, switch control members on the post actuated by said dogs to control the operation of said reversing switch and said electromagnet control switch, and a pivotal mounting for said post to permit the post and control members supported thereon to be turned out of the path of the dogs.

14. In a machine tool, the combination of a tool, a movable work support, a reversible electric motor for driving the support, clutch connections for driving the support from the motor alternatively at a slow feed or quick traverse rate, a reversing switch for the motor, control devices for controlling the operation of said movable support comprising a manually operable control member and connections therefrom to reverse the switch and to shift the clutch from slow feed to quick traverse position, and means for delaying the shifting of the clutch by said member until after reversal has taken place.

15. In a machine tool, the combination of a tool, a tool support, a work support, an electric motor for moving one of said supports to impart relative feeding movements to the work and the tool, clutch connections arranged alternatively for driving the support from the motor at a slow feed or quick traverse rate, a motor reversing switch, and control devices for controlling automatically the operation of said movable support comprising devices actuated by the movement of said support to reverse said switch, and a device rendered operative by the movement of said support and acting only after said reversal has taken place to shift said clutch connections from slow feed to quick traverse position.

16. In a machine tool, the combination of a tool, a movable work support, reversible driving connections for the support including cooperating feed screw and nut elements and a slow feed and quick traverse clutch, a take-up mechanism having a take-up action to maintain a tight operating engagement between said feed screw and nut elements, means acting when rendered operative simultaneously to shift said clutch to quick traverse position and to ease off said take-up device to provide a free operating engagement between said feed screw and nut elements, devices actuated by the movement of the table in one direction to reverse the direction of drive and to control the operation of said clutch, and means controlled by said devices rendered operative only upon reversal of said driving connections to shift said clutch to quick traverse position and simultaneously to ease off said take-up device.

17. In a machine tool, the combination of a tool, a tool support, a work support, an electric motor for moving one of said supports to impart relative feeding movements to the work and the tool, connections including a clutch arranged alternatively for driving the support from the motor at a slow feed or quick traverse rate, a motor reversing switch, and control devices for controlling automatically the operation of said movable support comprising dogs mounted on said movable support, a control member actuated thereby to reverse the switch, and to shift the clutch from slow feed to quick traverse position, and means for delaying the shifting of the clutch by said member until after reversal has taken place.

18. In a machine tool, the combination of a tool, a tool support, a work support, an electric motor for moving one of said supports to impart relative feeding movements to the work and the tool, connections including a clutch arranged alternatively for driving the support from the motor at a slow feed or quick traverse rate, a motor reversing switch, an electromagnet acting when energized to move said clutch from slow feed to quick traverse position, an electric circuit for said electromagnet, and control devices for controlling automatically the operation of said movable support comprising dogs on said movable support, a switch control member engaged thereby to reverse the switch and simultaneously to close an electric contact in the magnet circuit, and means rendered operative by the reversal of the motor to close a second contact in said circuit to energize the magnet.

19. In a machine tool, the combination of a tool, a movable work support, cooperating feed screw and nut elements for driving the support, a power drive for relatively rotating said feed screw and nut elements to drive the support, a take-up device having a take-up action to maintain a tight operating engagement between said feed screw and nut elements, clutch connections in said power drive, connections for manually operating said support, and a hand feed control member adapted normally to lock said hand feed connections out of operation arranged when actuated simultaneously to disengage said clutch connections, to permit the engagement of the hand feed connections, and to ease off said take-up device to permit a free operating engagement between said feed screw and nut elements.

20. In a machine tool, the combination of a tool, a movable work support, driving connections for reciprocating said work support comprising a drive shaft connected to drive the work support, a driven slow feed clutch member sleeved on said shaft, a driven quick traverse clutch member sleeved on said shaft, a cooperating slow feed and quick traverse clutch member rigidly secured to said shaft between said driven clutch members, means for moving said drive shaft axially from an intermediate neutral position to drive the work support alternatively at a slow feed or quick traverse rate, hand feed connections including a normally inoperative clutch connection with said drive shaft, and a hand feed control member movable to lock the hand feed clutch in inoperative position or alternatively to move said drive shaft and slow feed and quick traverse clutch to neutral position and release the hand feed clutch.

21. In a machine tool, the combination of a tool, a movable work support, driving connections for reciprocating said work support comprising a drive shaft connected to drive the work support, a driven slow feed clutch member sleeved on said shaft, a driven quick traverse clutch member sleeved on said shaft, a cooperating slow feed and quick traverse clutch member rigidly secured to said shaft between said driven clutch members, means for moving said drive shaft axially from an intermediate neutral position to drive the work support alternatively at a slow feed or quick traverse rate, hand feed connections including a normally inoperative clutch connection with said drive shaft, and a hand feed control member acting when rendered operative to move said drive shaft and slow feed and quick traverse clutch to an intermediate neutral position, and simultaneously to permit the engagement of said hand feed clutch.

22. In a machine tool, the combination of a tool, a movable work support, driving connections for reciprocating said work support comprising a drive shaft connected to drive the work support, a driven slow speed clutch member sleeved on said shaft, a driven quick traverse clutch member sleeved on said shaft, a cooperating slow feed and quick traverse clutch member rigidly secured to the shaft between said driven clutch members, means for moving said drive shaft and slow feed and quick traverse clutch member axially from an intermediate neutral position to drive the work support alternatively at a slow feed or quick traverse rate, hand feed connections including a hand feed shaft, a clutch connection to said drive shaft, and control mechanism therefor comprising a plug arranged to engage the end of the drive shaft, a cam on said plug arranged to engage the end of the feed shaft, and a control member arranged when rendered operative to move said plug axially to engage with and position the drive shaft, and simultaneously to rotate said plug and cam to permit an axial adjustment of the feed shaft to engage the clutch connection with the drive shaft.

23. In a machine tool, the combination of a tool, a movable work support, driving connections for reciprocating said work support comprising a drive shaft connected to drive said work support, a driven slow feed clutch member sleeved on said shaft, a driven quick traverse clutch member sleeved on said shaft, a cooperating slow feed and quick traverse clutch member rigidly secured to the shaft between said driven clutch members, means for moving said drive shaft and slow feed and quick traverse clutch member axially from an intermediate neutral position to drive the work support alternatively at a slow feed or quick traverse rate, hand feed connections including a hand feed shaft set at an angle to said drive shaft adjustable axially toward and away from the drive shaft, and cooperating gears on the drive shaft and feed shaft located to permit the engagement of said gears only for a neutral position of the drive shaft and slow feed and quick traverse clutch secured thereto.

24. In a machine tool, the combination of a tool, a movable work support, a drive shaft, connections including cooperating feed screw and nut elements for driving the table from said drive shaft, a take-up device having a take-up action to maintain a tight operating engagement between the feed screw and nut elements, a driven slow feed clutch member sleeved on said shaft, a driven quick traverse clutch member sleeved on said shaft, a cooperating slow feed and quick traverse clutch member rigidly secured to the shaft between said driven clutch members, means for moving said drive shaft and slow feed and quick traverse clutch member axially from an intermediate neutral position to drive the work support alternatively at a slow feed or quick traverse rate, an element movable to ease off said take-up device to permit a free operating engagement between said feed screw and nut elements, and a connection between said drive shaft and element rendered operative by the movement of the drive shaft and clutch from slow feed to neutral or quick traverse position to ease off said take-up device.

25. In a machine tool, the combination of a tool, a movable work support, a drive shaft, connections including cooperating feed screw and nut elements for driving the table from said drive shaft, a take-up device having a take-up action to provide a tight operating engagement between said feed screw and nut elements, a driven slow feed clutch member sleeved on said shaft, a driven quick traverse clutch member sleeved on said shaft, a cooperating slow feed and quick traverse clutch member rigidly secured to the shaft between said driven clutch members, means for moving said drive shaft and slow feed and quick traverse clutch member axially from an intermediate neutral position to drive the work support alternatively at a slow feed or quick traverse rate, connections rendered operative by the movement of the drive shaft and clutch from slow feed to neutral or quick traverse position to ease off said take-up device to permit a free operating engagement between said feed screw and nut elements, hand feed connections including a normally inoperative clutch connection with said drive shaft, and a hand feed control member acting when rendered operative to move said drive shaft and slow feed and quick traverse clutch to an intermediate neutral position, and simultaneously to permit the engagement of said hand feed clutch.

26. In a machine tool, the combination of a tool, a movable work support, a drive shaft, connections including cooperating feed screw and nut elements for driving the table from said drive shaft, a take-up device having a yielding take-up action to provide a tight operating engagement between said feed screw and nut elements, a driven slow feed clutch member sleeved on said shaft, a driven quick traverse clutch member sleeved on said shaft, a cooperating slow feed and quick traverse clutch member rigidly secured to the shaft between said driven clutch members, means for moving said drive shaft and clutch axially from intermediate neutral position to drive the work support alternatively at a slow feed or quick traverse rate, and connections controlled by the movement of said drive shaft from slow feed to neutral position to partially ease off said take-up device, and by the continued movement of said drive shaft to quick traverse position to entirely ease off said take-up device to provide a free operating engagement between the feed screw and nut elements.

27. In a machine tool, the combination with a tool, a movable work support, cooperating feed screw and nut elements for actuating the support, driving connections for relatively rotating said feed screw and nut elements to actuate said support, means for controlling said driving connections alternatively to disconnect said driving connections and to drive the table at a slow feed or quick traverse rate, a take-up device having a yielding take-up action to provide a tight operating engagement between said feed screw and nut elements, and connections controlled by said control means to partially ease off said take-up device upon disconnecting of said driving connections and to entirely ease off said take-up device during quick traverse operation of the table to provide a free operating engagement between said feed screw and nut elements.

28. In a machine tool, the combination with a tool, a movable work support, cooperating feed screw and nut elements for actuating the support, clutch connections shiftable to drive the table alternatively at a slow feed or quick traverse rate or to disconnect the table drive, a take-up device having a take-up action to provide a tight operating engagement between said feed screw and nut elements, means for controlling said take-up device acting when rendered operative alternatively to partially or wholly ease off said take-up device, and control means for said clutch connections and for said ease-off means arranged upon shifting said clutch connections to disconnect the table drive to partially ease off the take-up device, and upon shifting said clutch connections to quick traverse position to wholly ease off said take-up device.

29. In a machine tool, the combination of a movable work support, cooperating feed screw and nut elements for actuating the support, driving connections having a hand feed position and shiftable to drive the support alternatively at a slow feed or quick traverse rate, a hand feed for said support, a take-up device having a take-up action to maintain a tight operating engagement between said feed screw and nut elements, means operable to partially or wholly ease off said take-up device, and control means for controlling said driving connections and ease-off means operable upon shifting said connections to hand feed position to partially ease off said take-up device, and upon shifting of said connections to quick traverse position to wholly ease off said take-up device.

30. In a machine tool, the combination of a rotary milling cutter supporting spindle, a movable work support, a reversible electric motor for driving said work support, driving connections including slow feed and quick traverse clutch connections for driving the table from the motor, and electrically operated devices for controlling the operation of the table comprising an electromagnet for controlling the operation of said slow feed and quick traverse clutch connections, a switch for controlling the operation of said electromagnet, a reversing switch for the motor, control dogs mounted on the table, slow feed left and right switch control members arranged in the path of said dogs, and left and right quick traverse control members located in the path of said dogs, said parts being arranged so that the operation of either slow feed switch control member will control said switches to shift said clutch connections to slow feed position and to determine the direction of feed, and the operation of either left or right quick traverse switch control member will control said switches to engage said quick traverse clutch connection and to determine the direction of drive.

31. In a machine tool, the combination of a rotary milling cutter supporting spindle, a movable work support, a reversible electric motor for driving said work support, driving connections including slow feed and quick traverse clutch connections for driving the table from the motor, and electrically operated devices for controlling the operation of the table comprising a reversing switch for the motor, an electromagnet for controlling the operation of said slow feed and quick traverse clutch connections, a control switch therefor, slow feed left and right switch control members arranged to control the operation of said switches to engage said slow feed clutch connections and to determine the direction of drive of the table, and left and right quick traverse switch control members arranged when rendered operative to control the operation of said switches to energize the electromagnet to shift said clutch connections to quick traverse position and simultaneously to control the position of said reversing switch to determine the direction of drive.

32. In a machine tool, the combination of a rotary milling cutter supporting spindle, a movable work support, a reversible two-speed electric motor for driving said work support, driving connections including slow feed and quick traverse clutch connections for driving the table from the motor, and electrically operated devices for controlling the operation of the table comprising a reversing switch for the motor, a high speed and low speed switch for the motor, an electromagnet for controlling the operation of said slow feed and quick traverse clutch connections, a control switch therefor, slow feed left and right switch control members alternatively operable to control the operation of said reversing switch to determine the direction of drive, to move said electromagnet control switch to slow feed position, and to move the high and slow feed switch to slow feed position, and left and right quick traverse control members alternatively operable to control the position of said reversing switch to determine the direction of drive, to shift said electromagnet control switch to quick traverse position, and to shift said high and low speed switch to high speed position.

33. In a machine tool, the combination of a rotary milling cutter supporting spindle, a movable work support, a reversible two-speed electric motor for driving said work support, driving connections including slow feed and quick traverse clutch connections for driving the table from the motor, and electrically operated devices for controlling the operation of the table comprising a two-speed switch for the motor, a reversing switch for the motor, an electromagnet for controlling the operation of said slow feed and quick traverse clutch connections, a control switch therefor, subsidiary switch connections controlled by the movement of the table for operating said switches, slow feed left and right switch control members for said subsidiary switch connections to control the operation of said reversing switch, said two-speed switch, and said electromagnet control switch to drive the table at a slow traverse rate in either direction, and left and right quick traverse switch control members for said subsidiary switch connections arranged when rendered operative to control the operation of said reversing switch, said high and low speed switch and said electromagnet control switch to drive the table at a maximum quick traverse rate in either direction.

34. In a machine tool, the combination with a rotary milling cutter supporting spindle, a driving motor for the spindle, a movable work support, a reversible electric motor for driving said work support, driving connections including slow feed and quick traverse clutch connections for driving the table from said reversible member, and electrically operated devices for controlling the operation of the table comprising a reversing switch for the reversible motor, an electromagnet for controlling the operation of said slow feed and quick traverse clutch connections, a control switch therefor, a starting and stopping switch for the spindle motor, slow feed left and right switch control members arranged when rendered operative to control the operation of said switches to determine the direction of drive, to de-energize said electromagnet for slow feed operation of the table and to start the spindle motor, and left and right quick traverse switch control members arranged when rendered operative to control the operation of said reversing switch to determine the direction of drive, to energize the electromagnet to shift said clutch connections to quick traverse position, and simultaneously to stop the spindle motor.

35. In a machine tool, the combination of a rotary cutter spindle adapted to receive two oppositely faced cutters, a movable work support, reversible driving connections for the work support, a reversible electric motor for driving the cutter spindle, a reversing switch for the spindle motor, a control element for said reversible driving connections to reverse the direction of support movement, a dog adjustably supported on the table, a second control member engaged thereby for actuating said reversing switch to reverse the direction of rotation of the cutter spindle to secure a predetermined direction of rotation thereof with relation to the direction of travel of the table for the performance of similar milling operations during the travel of the table in each direction.

36. In a machine tool, the combination of a movable work table, a rotary cutter spindle adapted to support two oppositely faced cutters, driving connections for said table including a reversible table motor, driving connections for the spindle including a reversible spindle motor, switch connections for reversing the table motor, switch connections for reversing the spindle motor, and means controlled by the operation of said table motor for controlling said spindle motor reversing switch to secure a predetermined direction of rotation of the spindle with relation to the direction of travel of the table for the performance of similar milling operations during the travel of the table in each direction.

37. In a machine tool, the combination of a movable work table, a rotary cutter spindle adapted to support two oppositely faced cutters, driving connections for said table including a reversible table motor, driving connections for the spindle including a reversible spindle motor, switch connections for reversing the table motor, switch connections for reversing the spindle motor, means controlled by the direction of operation of said table motor for controlling said spindle motor reversing switch to secure a predetermined direction of rotation of the spindle with relation to the direction of travel of the table for the performance of similar milling operations during the travel of the table in each direction, and means under the control of the operator for varying the operation of said controlling means for the spindle motor to produce alternatively hook milling or plain milling for both directions of movement of the table.

38. In a machine tool, the combination of a movable work table, a rotary cutter spindle adapted to support two oppositely faced cutters, driving connections for said table including a reversible table motor, means for adjusting said connections to drive said table alternatively at a slow feed or a quick traverse rate, driving connections for said spindle including a reversible spindle motor, switch connections for reversing the spindle motor, means controlled by the direction of operation of the table motor for controlling the spindle motor reversing switch to secure a predetermined direction of rotation of the spindle with relation to the direction of travel of the table for the performance of similar milling operations during the travel of the table in each direction, means under the control of the operator for varying the operation of said controlling means for the spindle motor to produce alternatively hook milling or plain milling for both directions of movement of the table, and means controlled by the adjustment of said driving connections for the table for quick traverse operation to disconnect the spindle motor.

39. A machine tool having, in combination, a base, a work support slidably mounted on said base, a reversible electric motor for driving said work support, driving connections including slow feed and quick traverse clutch connections for driving the table from the motor, electrically operated means for reversing the motor to reverse the direction of drive, electrically operated means for shifting said clutch whereby the support is driven by the motor alternatively at feeding and quick traverse rates, a feed control element, and a quick traverse control element for actuating the support in opposite directions respectively at feeding and quick traverse rates, subsidiary switch connections whereby the actuation of said feed control element will actuate the support at a feeding rate in one direction, and subsidiary switch connections including plugging switch connections to the motor whereby the actuation of said quick traverse control element will reverse the motor and will shift the clutch to quick traverse position only after reversal has taken place.

40. A machine tool having, in combination, a base, a work support slidably mounted on said base, a reversible electric motor and connections therefrom for reciprocating said support alternatively at feeding and quick traverse rates, electrically operated means whereby the support is driven by the motor alternatively at feeding and quick traverse rates, electrically operated means for reversing the motor to reverse the direction of drive, separate feed left, feed right, fast left, and fast right control elements, and subsidiary switch connections whereby the actuation of any one of said control elements will effect a corresponding adjustment of each of said electrically operated means to produce the corresponding direction and rate of travel of the support.

41. A machine tool having, in combination, a base, a work support slidably mounted on said base, a reversible electric motor and connections therefrom for reciprocating said support alternatively at feeding and quick traverse rates, electrically operated means whereby the support is driven by the motor alternatively at feeding and quick traverse rates, electrically operated means for reversing the motor to reverse the direction of drive, a stop switch for the motor, left and right feed control devices, fast left and right control devices, stop switch control devices, subsidiary switch connections whereby the actuation of any one of said control devices is directly operative to effect a corresponding adjustment of each of said electrically operated means to determine the direction and rate of continued travel of the support or to stop the support.

42. A machine tool having, in combination, a base, a work support slidably mounted on said base, a reversible electric motor and connections therefrom for reciprocating said support alternatively at feeding and quick traverse rates, electrically operated means whereby the support is driven by the motor alternatively at feeding and quick traverse rates, electrically operated means for reversing the motor to reverse the direction of drive, and means for controlling automatically said electrically operated means comprising dogs on the support, separate feed left, feed right, fast left and fast right control elements arranged in vertical relationship for actuation only by dogs of a corresponding level, and subsidiary switch connections whereby the actuation of any one of said control elements by a cooperating dog will effect a corresponding adjustment of each of said electrically operated means at the desired point in the travel of the table in either direction.

43. A machine tool having, in combination, a base, a work support slidably mounted on said base, a reversible electric motor and connections therefrom for reciprocating said support alternatively at feeding and quick traverse rates, electrically operated means whereby the support is driven by the motor alternatively at feeding and quick traverse rates, electrically operated means for reversing the motor to reverse the direction of drive, and means for controlling automatically said electrically operated means comprising separate feed left, feed right, fast left and fast right control elements, dogs on the support adjustable to selectively actuate said control elements to produce alternate feeding and traverse rates of travel of the support in each direction, and subsidiary switch connections whereby the actuation of any one of said control elements by a cooperating dog will effect a corresponding adjustment of each of said electrically operated means to control the operation of the support.

44. A machine tool having, in combination, a base, a work support slidably mounted on said base, a reversible electric motor and connections therefrom for reciprocating said support alternatively at feeding and quick traverse rates, electrically operated means whereby the support is driven by the motor alternatively at feeding and quick traverse rates, electrically operated means for reversing the motor to reverse the direction of drive, and means for controlling said electrically operated means comprising separate feed left, feed right, fast left, and fast right control elements, dogs on the support adjustable to selectively actuate said control elements to reverse and to produce alternating feeding and traverse rates of travel of the support, manually operable devices for selectively actuating any one of said control elements, and subsidiary switch connections whereby the actuation of any one of said control elements will effect a corresponding adjustment of each of said electrically operated means to control the operation of the support.

45. A machine tool having, in combination, a base, a work support slidably mounted on said base, a reversible electric motor, driving connections including slow feed and quick traverse clutch connections for driving the table from the motor, electrically operated means for shifting the clutch whereby the support is driven by the motor alternatively at feeding and quick traverse rates, electrically operated means for stopping the motor, and means for controlling said electrically operated means comprising a slow feed control element adjacent said support, a quick traverse control element adjacent said support, a reversing element adjacent said support, a stop element adjacent said support, dogs on the support adjustable to permit alternate operation of said feed and quick traverse control elements at any point or points during the travel of the support in one direction, a dog for operating said reversing element, a dog for operating said stopping element, and subsidiary switch connections whereby the actuation of any one of said control elements by a cooperating dog will effect a corresponding adjustment of each of said electrically operated means for controlling the operation of the support.

46. In a machine tool, the combination of a rotary cutter spindle adapted to support two oppositely faced cutters, a movable work support, a reversible spindle electric motor, a reversible electric motor and connections therefrom for reciprocating the support alternatively at feeding and quick traverse rates, electrically operated means whereby the support is driven by its motor alternatively at feeding and quick traverse rates, electrically operated means for reversing the support motor to reverse the direction of drive, electrically operated means for reversing the spindle motor, electrically operated means for stopping the spindle motor, and means for controlling said electrically operated means comprising separate feed left, feed right, fast left and fast right control elements, subsidiary switch connections whereby the actuation of said feed left or feed right control elements will effect an adjustment of each of said electrically operated means to move the support in the corresponding direction at a feed rate and to rotate the spindle in a corresponding direction for the performance of similar milling operations during the travel of the table in each direction, and subsidiary switch connections whereby the actuation of either of said fast left or fast right control elements will effect a corresponding adjustment of each of said electrically operated means to move the table at a quick traverse rate and simultaneously stop the rotation of the spindle.

47. A machine tool having, in combination, a base, a work support slidably mounted on said base, a reversible electric motor and connections therefrom for reciprocating said support alternatively at feeding and quick traverse rates, electrically operated means whereby the support is started and stopped and is driven by the motor alternatively at feeding and quick traverse rates, electrically operated means for reversing the motor to reverse the direction of drive, an electrical control for the machine comprising a plurality of operating circuits each controlling both of said electrically operated means, and interchangeably connectible to determine at any instant of operation the direction and rate of movement of the support, and switch control means for interchangeably connecting said circuits.

48. A machine tool having, in combination, a base, a work support slidably mounted on said base, a reversible electric motor and connections therefrom for reciprocating said support alternatively at feeding and quick traverse rates, electrically operated means whereby the support is started and stopped and is driven by the motor alternatively at feeding and quick traverse rates, electrically operated means for reversing the motor to reverse the direction of drive, an electrical control for the machine comprising a plurality of operating circuits each controlling both of said electrically operated means, and interchangeably connectible to determine at any instant of operation the direction and rate of movement of the support, and switch control means for connecting any one of said circuits and simultaneously for rendering the others of said circuits inoperative and including a single operable control element for effecting the required operating condition.

49. A machine tool comprising, in combination, a base, a support slidably mounted on said base, an electric motor for reciprocating said support at feed and traverse speeds, feed-traverse gearing connecting said motor and said support so that the support is driven at feed and traverse rates by said motor including elecrically controlled means for shifting said gearing from feed to traverse and vice versa, an electric control circuit for reversing the direction of movement of said support, and an electric control circuit for causing said shiftable means to change said gearing from feed to traverse and including means for delaying the shift to increase the time during which reversal of the support may be effected.

50. A machine tool comprising, in combination, a base, a support slidably mounted on said base, a reversible electric motor for reciprocating said support at feed and traverse speeds and arranged to be started and stopped to start and stop said support and to be reversed to reverse the direction of movement of the support, feed-traverse gearing connecting said motor and said support so that the support is driven at feed and traverse rates by said motor including electrically operated means for shifting said gearing from feed to traverse and vice versa, a control circuit for said motor including a reversing switch for governing the direction and operation of the motor, and a control circuit for causing said shiftable means to change said gearing from feed to traverse and including means for delaying the shift to rapid traverse to provide time in which to reduce the speed of the motor when the shift from feed to rapid traverse is accompanied by reversal of support movement.

BENJAMIN P. GRAVES.
ARTHUR F. BENNETT.